(12) United States Patent
Fujioka

(10) Patent No.: US 9,473,622 B2
(45) Date of Patent: Oct. 18, 2016

(54) CALL CONTROL SERVER

(75) Inventor: Susumu Fujioka, Kanagawa (JP)

(73) Assignee: RICOH COMPANY, LIMITED, Tokyo (JP)

( * ) Notice: Subject to any disclaimer, the term of this patent is extended or adjusted under 35 U.S.C. 154(b) by 2425 days.

(21) Appl. No.: 11/633,042

(22) Filed: Dec. 4, 2006

(65) Prior Publication Data
US 2007/0127455 A1  Jun. 7, 2007

(30) Foreign Application Priority Data

Dec. 7, 2005 (JP) ................................. 2005-352784

(51) Int. Cl.
| | |
|---|---|
| *H04L 12/66* | (2006.01) |
| *H04M 3/38* | (2006.01) |
| *H04M 7/00* | (2006.01) |
| *H04M 3/42* | (2006.01) |

(52) U.S. Cl.
CPC ........... *H04M 3/387* (2013.01); *H04M 3/4211* (2013.01); *H04M 7/006* (2013.01); *H04M 3/42102* (2013.01); *H04M 2201/52* (2013.01)

(58) Field of Classification Search
CPC ...................................................... H04L 1/00
USPC ........................................................ 709/227
See application file for complete search history.

(56) References Cited

U.S. PATENT DOCUMENTS

| | | | | | |
|---|---|---|---|---|---|
| 5,659,596 | A * | 8/1997 | Dunn | ..................... | H04W 4/12 455/456.1 |
| 6,205,552 | B1 * | 3/2001 | Fudge | ............................. | 726/25 |
| 6,463,053 | B1 * | 10/2002 | Chen | .................... | H04Q 3/0029 370/352 |
| 6,883,094 | B2 * | 4/2005 | Kitamura | ...................... | 713/150 |
| 7,069,291 | B2 * | 6/2006 | Graves | ............... | H04M 3/5191 709/201 |
| 7,594,259 | B1 * | 9/2009 | Audet | ................... | H04L 63/029 713/153 |
| 2001/0005382 | A1 * | 6/2001 | Cave | ...................... | H04L 29/06 370/466 |
| 2001/0040697 | A1 * | 11/2001 | Wu | .................... | H04N 1/00281 358/1.15 |
| 2002/0001302 | A1 * | 1/2002 | Pickett | ............... | H04L 12/2856 370/352 |

(Continued)

FOREIGN PATENT DOCUMENTS

| | | |
|---|---|---|
| JP | 06-104900 | 4/1994 |
| JP | 2004-023215 | 1/2004 |

(Continued)

OTHER PUBLICATIONS

"Introduction, This document describes the software applications developed around the Cisco IP Telephony solution deployed at INRIA Rocquencourt.", http://wwwroc.inria.fr/~sultan/iptelJavaCiscoEng.html, 2003.

(Continued)

*Primary Examiner* — Andrew Goldberg
(74) *Attorney, Agent, or Firm* — Harness, Dickey & Pierce, P.L.C.

(57) ABSTRACT

In a communication system that includes a communication terminal that originates and receives a call through a call control server, the call control server receives destination information from the communication terminal as a call request. The call control server checks an address of the communication terminal and determines based on the destination information whether transmission to a destination terminal is permitted for the communication terminal. Only when the transmission is permitted, the call control server originates a call to an address corresponding to the destination information to connect the communication terminal to the destination terminal.

10 Claims, 32 Drawing Sheets

(56) References Cited

U.S. PATENT DOCUMENTS

| | | | |
|---|---|---|---|
| 2002/0116487 A1* | 8/2002 | Iseda et al. | 709/223 |
| 2002/0124189 A1* | 9/2002 | Bakke | H04L 63/029 726/11 |
| 2003/0002476 A1* | 1/2003 | Chung et al. | 370/352 |
| 2003/0067923 A1* | 4/2003 | Ju et al. | 370/395.3 |
| 2003/0091028 A1* | 5/2003 | Chang | H04M 7/0057 370/352 |
| 2003/0095542 A1* | 5/2003 | Chang et al. | 370/352 |
| 2003/0123436 A1* | 7/2003 | Joseph et al. | 370/352 |
| 2003/0164986 A1* | 9/2003 | Boire-Lavigne | H04L 12/5835 358/400 |
| 2004/0039940 A1* | 2/2004 | Cox et al. | 713/201 |
| 2004/0184467 A1* | 9/2004 | Watanabe | 370/401 |
| 2005/0014487 A1* | 1/2005 | Kobayashi et al. | 455/412.1 |
| 2005/0108539 A1* | 5/2005 | Skog | G06F 21/31 713/176 |
| 2006/0013244 A1* | 1/2006 | Yamamoto | H04N 1/0022 370/432 |
| 2006/0072620 A1* | 4/2006 | Chatterjee | 370/477 |
| 2006/0080444 A1* | 4/2006 | Peddemors et al. | 709/227 |
| 2006/0146784 A1* | 7/2006 | Karpov | H04L 12/2856 370/351 |
| 2006/0153167 A1* | 7/2006 | Schunemann | 370/352 |
| 2006/0262916 A1* | 11/2006 | Marascio | H04L 29/06027 379/201.01 |
| 2007/0047532 A1* | 3/2007 | Bangor et al. | 370/356 |
| 2007/0201651 A1* | 8/2007 | Bontempi | 379/142.02 |
| 2008/0059640 A1* | 3/2008 | Oka | H04L 29/06027 709/228 |

FOREIGN PATENT DOCUMENTS

| | | |
|---|---|---|
| JP | 2004-096495 | 3/2004 |
| JP | 2004-185498 | 7/2004 |
| JP | 2004-289782 | 10/2004 |

OTHER PUBLICATIONS

"The Bank of Kyoto introduces Fax Incorrect Transmission Prevention System", http://www.kyotobank.co.jp/news/pdf/2005_07_21.pdf, 2005.

* cited by examiner

FIG. 4

| | ALIAS NUMBER | IP ADDRESS | |
|---|---|---|---|
| INFORMATION REGARDING AREA ARa | 3225 | 192. 168. 30. 50 | IP-FAX |
| | 3224 | 192. 168. 30. 52 | IP-PHONE |
| | 3222 | 192. 168. 30. 54 | IP-PHONE |
| | ... | ... | |
| INFORMATION REGARDING AREA ARb | 1158 | 192. 168. 40. 70 | IP-FAX |
| | 1160 | 192. 168. 40. 72 | IP-PHONE |
| | 1162 | 192. 168. 40. 74 | IP-PHONE |
| | ... | ... | |
| INFORMATION REGARDING AREA ARc | 2140 | 192. 168. 50. 110 | IP-FAX |
| | 2142 | 192. 168. 50. 112 | IP-PHONE |
| | 2144 | 192. 168. 50. 114 | IP-PHONE |
| | ... | ... | |

FIG. 5

| | SOURCE IP ADDRESS | DESTINATION ALIAS NUMBER |
|---|---|---|
| INFORMATION REGARDING FXa | 192. 168. 30. 50 | 1158 |
| | 192. 168. 30. 50 | 2140 |
| | ... | ... |
| INFORMATION REGARDING FXb | 192. 168. 40. 70 | 2140 |
| | 192. 168. 40. 70 | 3225 |
| | ... | ... |
| INFORMATION REGARDING FXc | 192. 168. 50. 110 | 3225 |
| | 192. 168. 50. 110 | 1158 |
| | ... | ... |

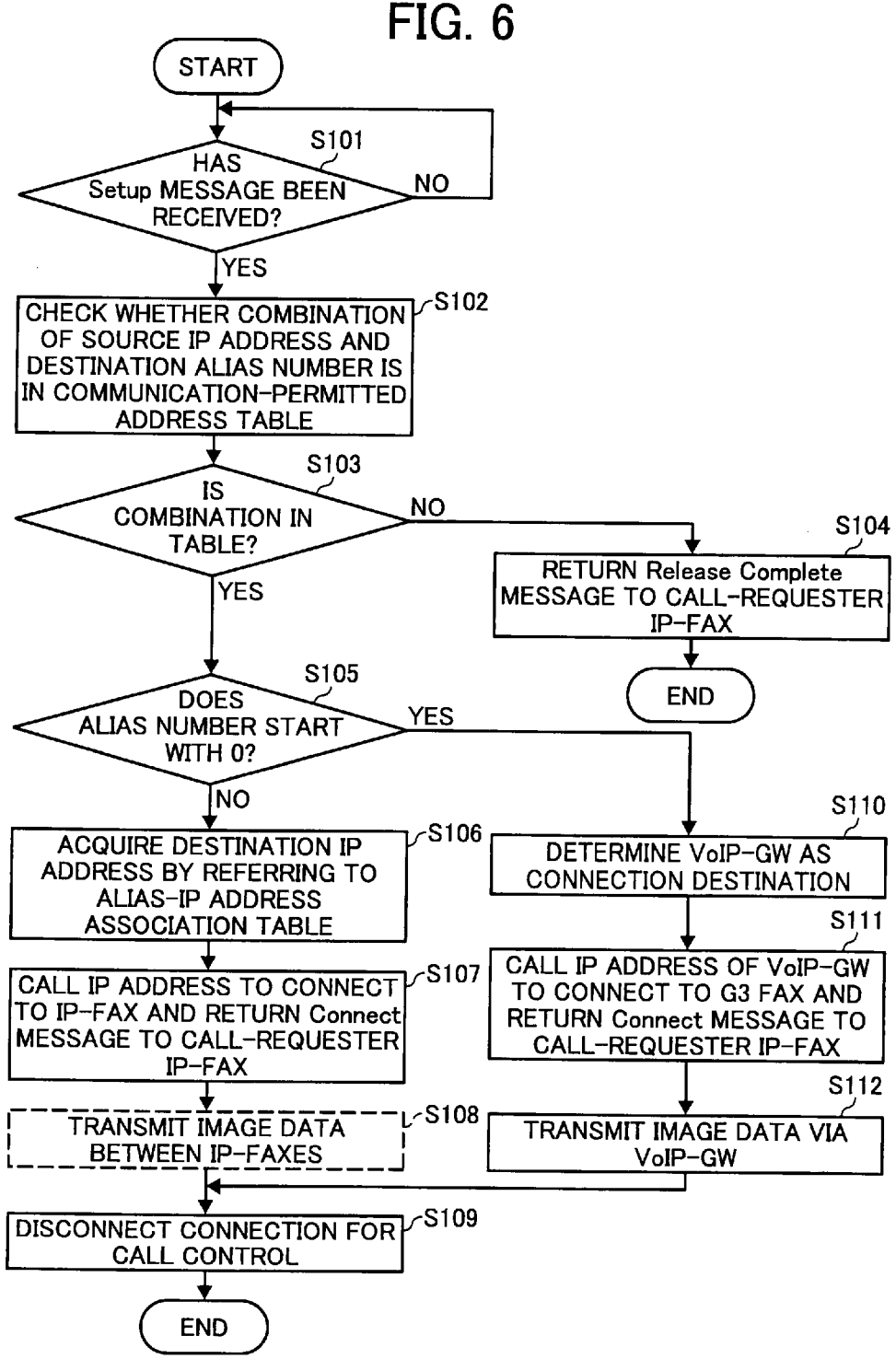

FIG. 7A

| ALIAS NUMBER | IP ADDRESS |
|---|---|
| 3225 | 192. 168. 30. 50 |
| 1158 | 192. 168. 40. 70 |
| 2140 | 192. 168. 50. 110 |

FIG. 7B

| | |
|---|---|
| 3224 | 192. 168. 30. 52 |
| 3222 | 192. 168. 30. 54 |
| . . . | . . . |
| 1160 | 192. 168. 40. 72 |
| 1162 | 192. 168. 40. 74 |
| . . . | . . . |
| 2142 | 192. 168. 50. 112 |
| 2144 | 192. 168. 50. 114 |
| . . . | . . . |

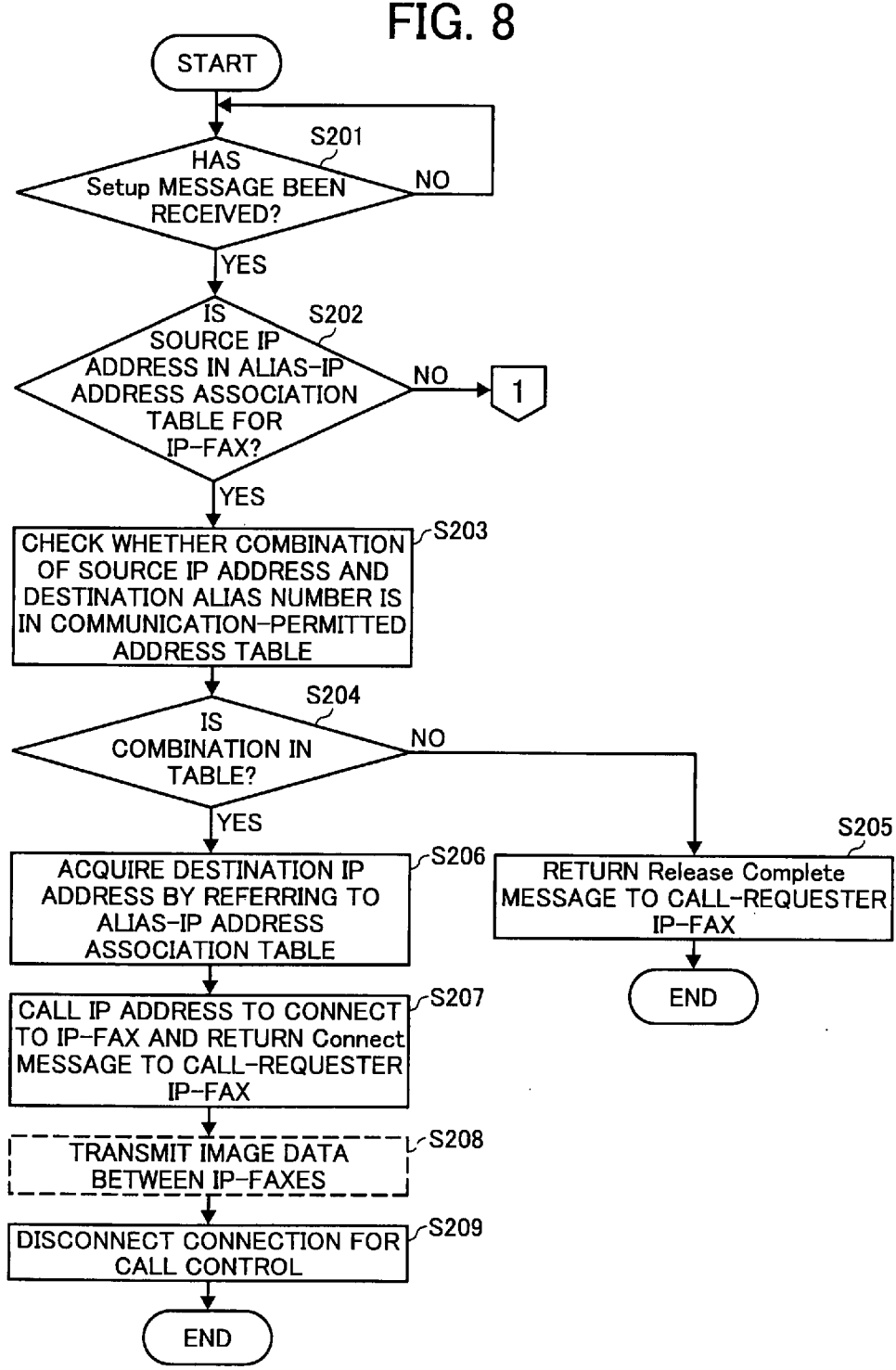

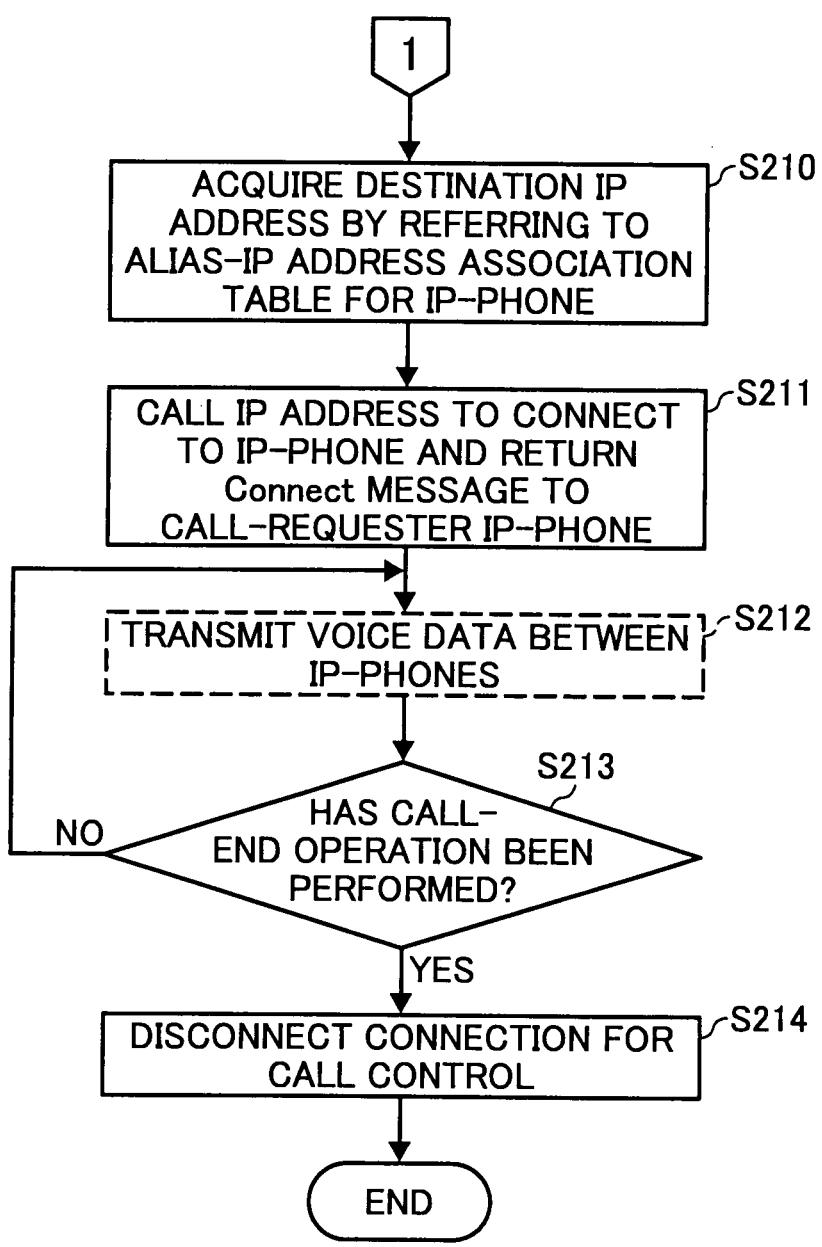

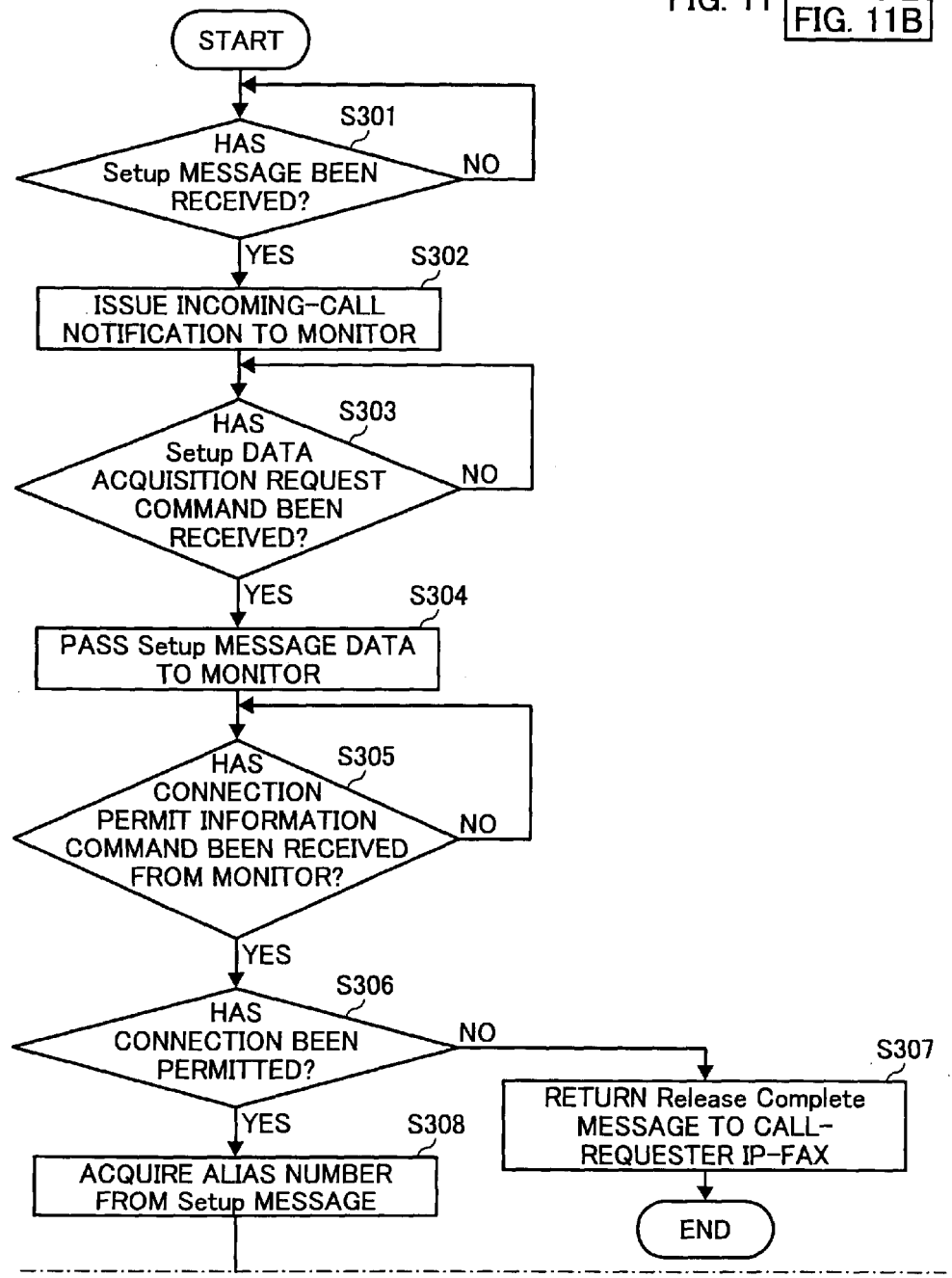

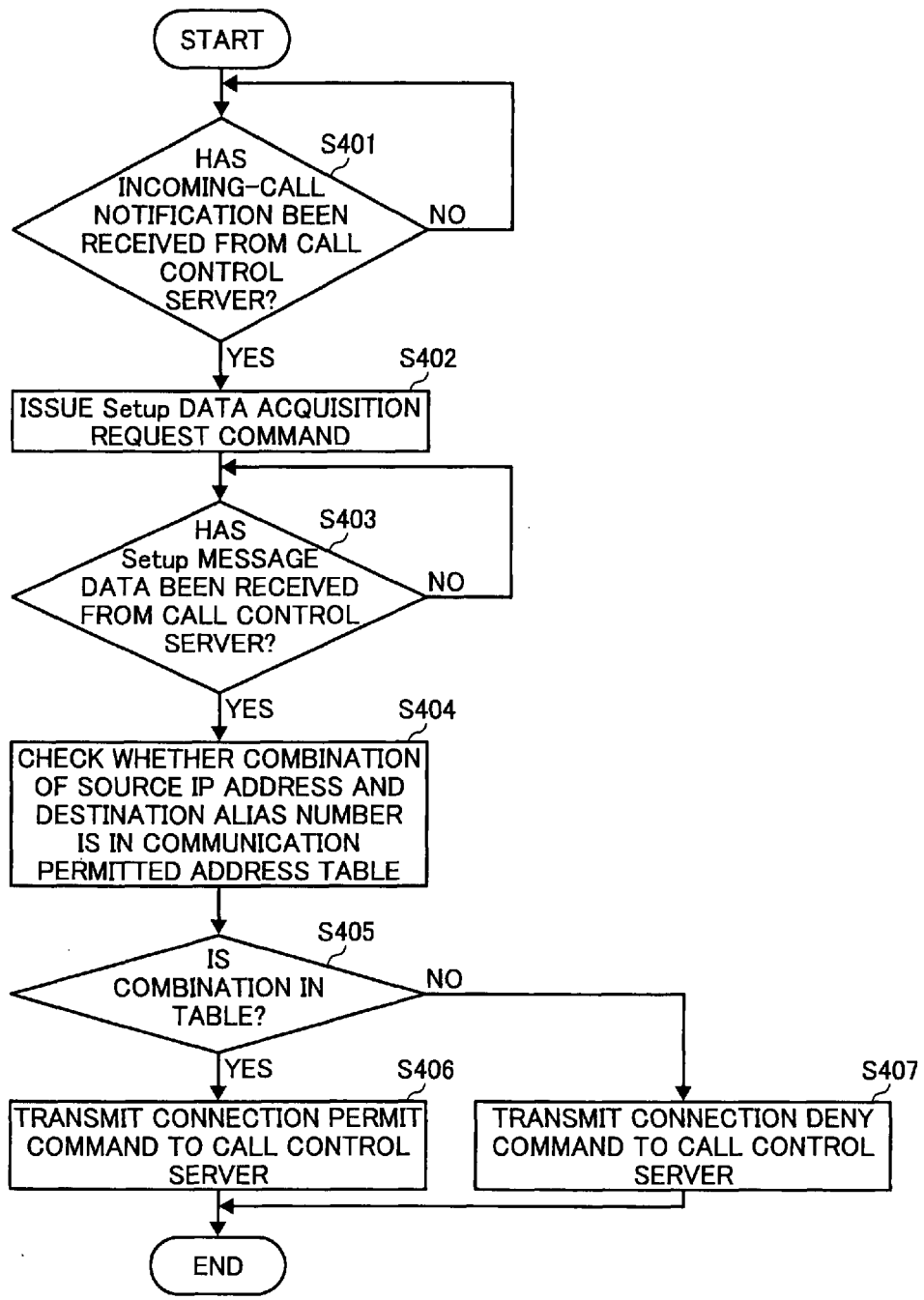

FIG. 15A

| SOURCE IP ADDRESS | SENDER'S USER CODE | DESTINATION ALIAS NUMBER |
|---|---|---|
| 192. 168. 30. 50 | 0003 | 1158 |
| 192. 168. 30. 50 | 0012 | 2140 |
| ... | ... | ... |
| 192. 168. 40. 70 | 0117 | 2140 |
| 192. 168. 40. 70 | 0121 | 3225 |
| ... | ... | ... |
| 192. 168. 50. 110 | 0169 | 3225 |
| 192. 168. 50. 110 | 0175 | 1158 |
| ... | ... | ... |

INFORMATION REGARDING FZa (rows 1-3)
INFORMATION REGARDING FZb (rows 4-6)
INFORMATION REGARDING FZc (rows 7-9)

FIG. 15B

| SENDER'S USER CODE | DESTINATION ALIAS NUMBER |
|---|---|
| 0003 | 1158 |
| 0012 | 2140 |
| ... | ... |
| 1117 | 2140 |
| 1121 | 3225 |
| ... | ... |
| 2169 | 3225 |
| 2175 | 1158 |
| ... | ... |

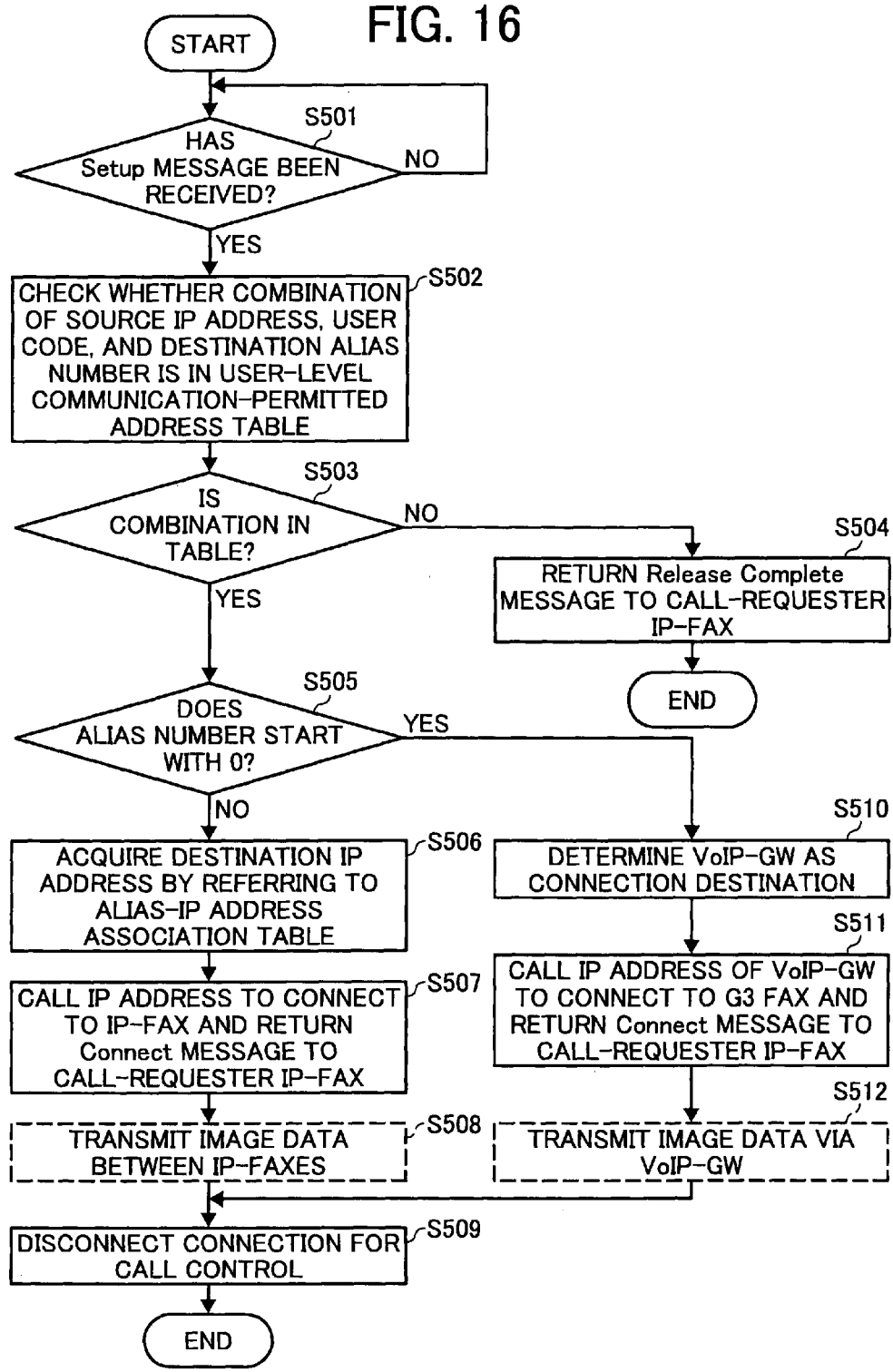

FIG. 18

| | SOURCE IP ADDRESS | SOURCE GROUP CODE | DESTINATION ALIAS NUMBER |
|---|---|---|---|
| INFORMATION REGARDING FZa | 192. 168. 30. 50 | 0001 | 1158 |
| | 192. 168. 30. 50 | 0002 | 2140 |
| | . . . | . . . | . . . |
| INFORMATION REGARDING FZb | 192. 168. 40. 70 | 0001 | 2140 |
| | 192. 168. 40. 70 | 0002 | 3225 |
| | . . . | . . . | . . . |
| INFORMATION REGARDING FZc | 192. 168. 50. 110 | 0001 | 3225 |
| | 192. 168. 50. 110 | 0002 | 1158 |
| | . . . | . . . | . . . |

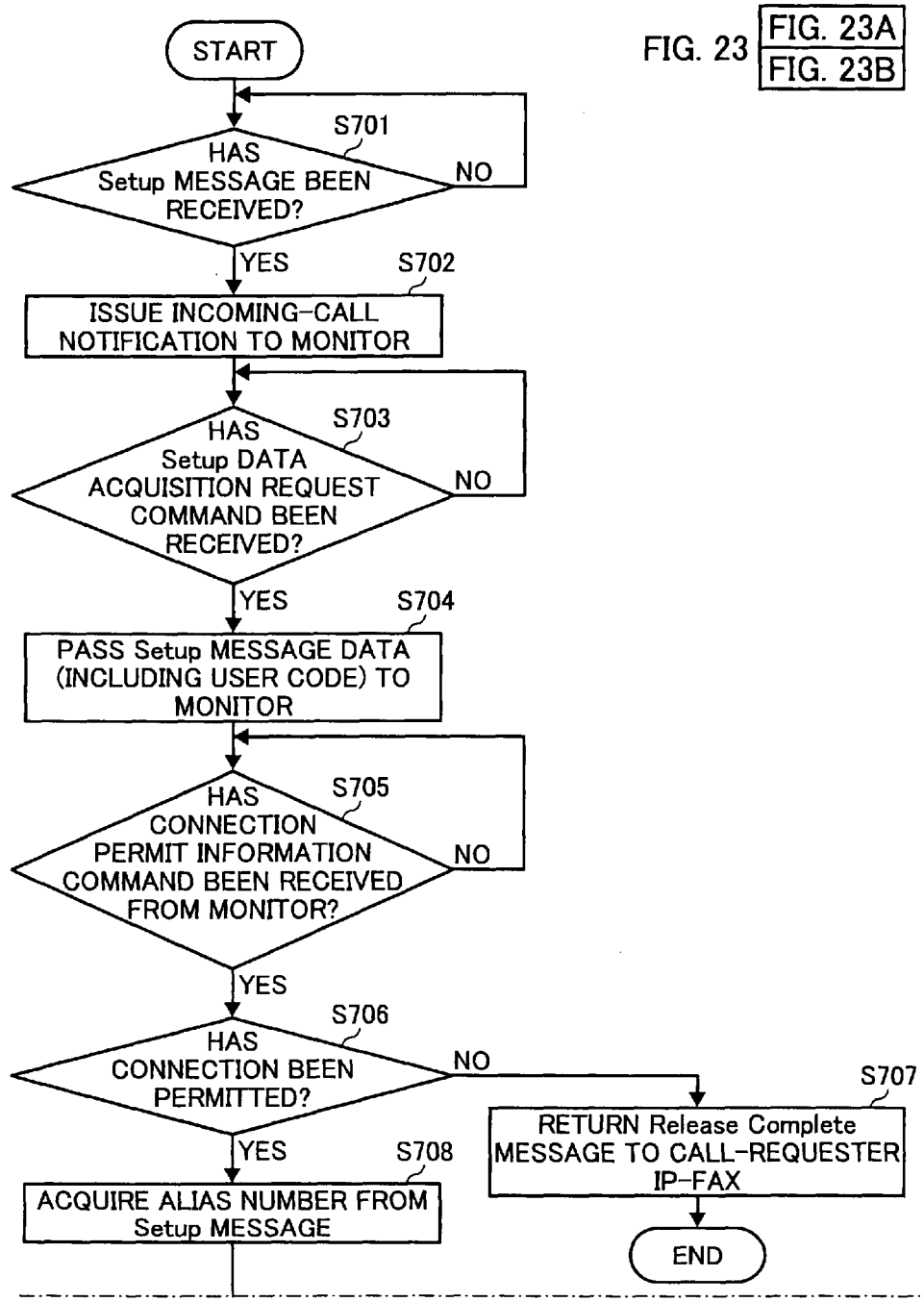

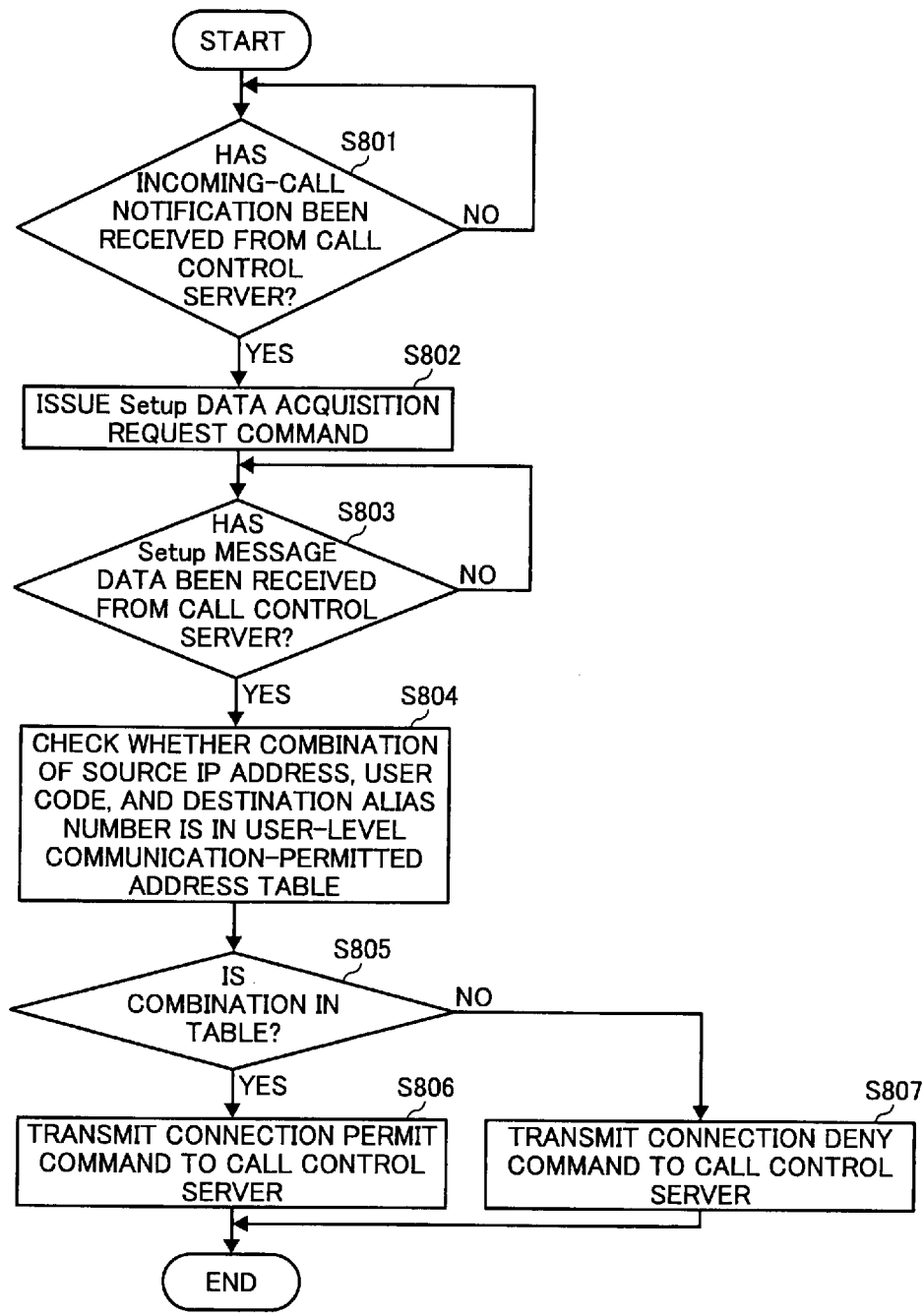

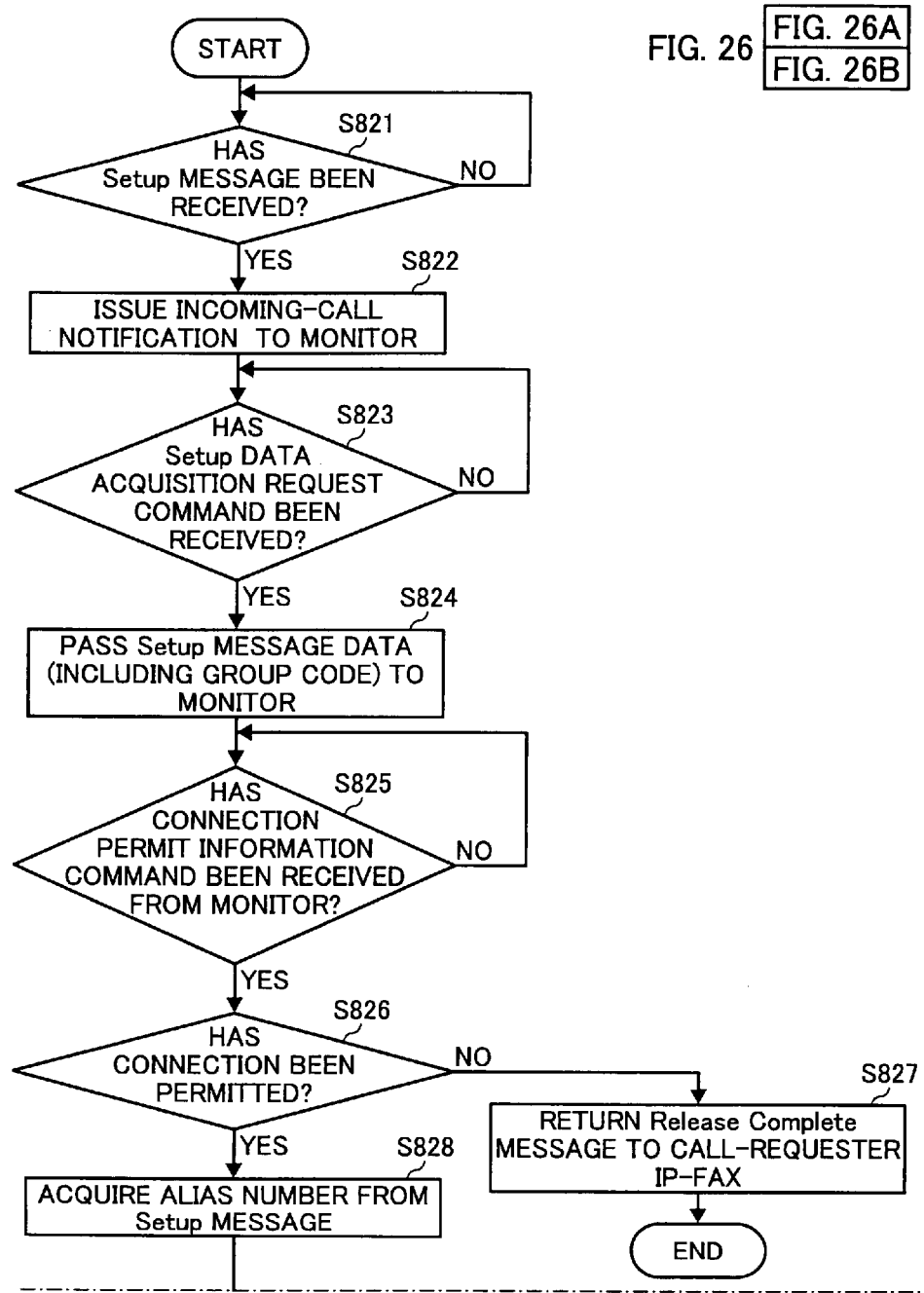

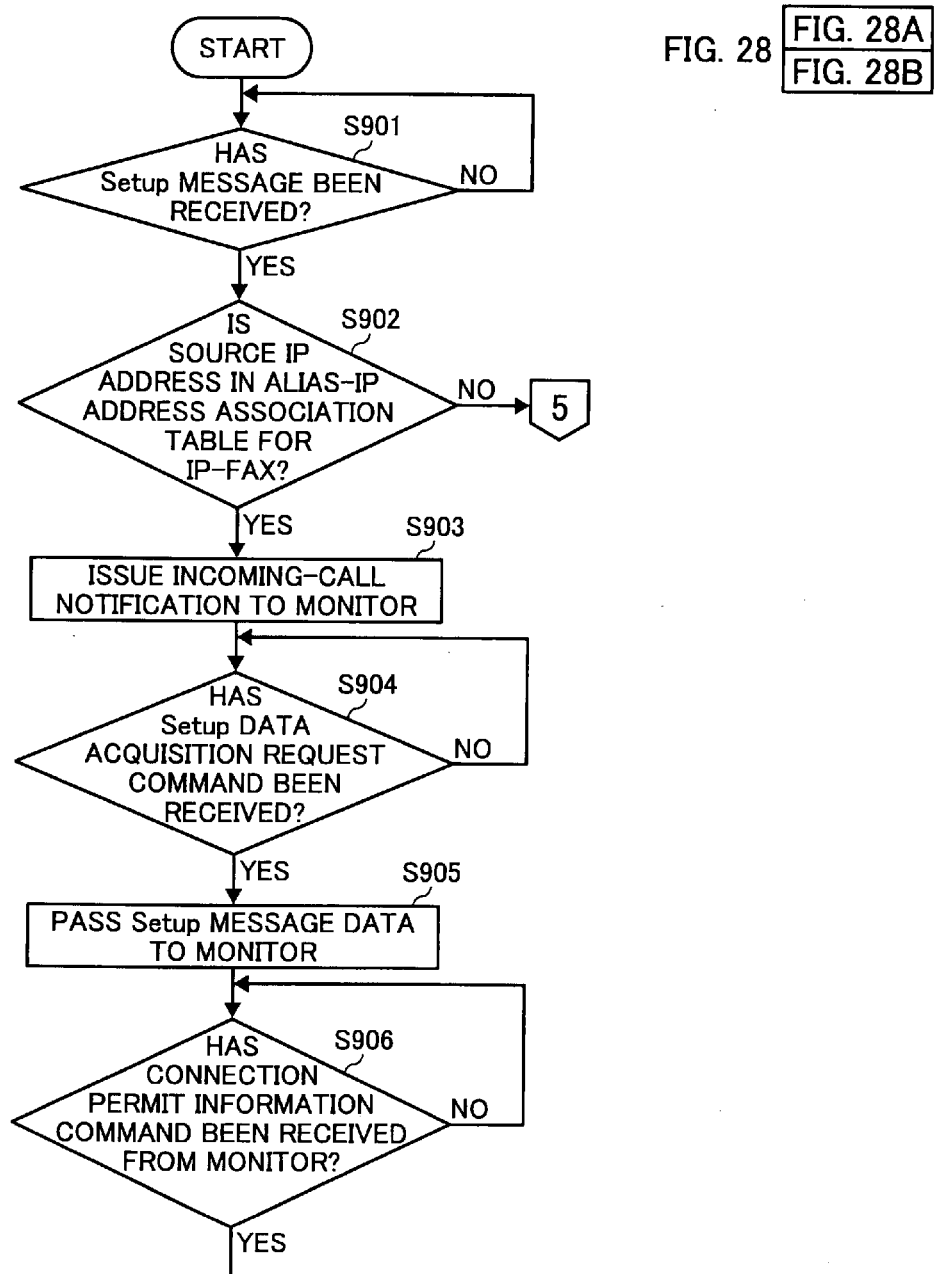

CALL CONTROL SERVER

CROSS-REFERENCE TO RELATED APPLICATIONS

The present document incorporates by reference the entire contents of Japanese priority document, 2005-352784 filed in Japan on Dec. 7, 2005.

BACKGROUND OF THE INVENTION

1. Field of the Invention

The present invention relates to a call control server that connects a communication terminal to another terminal.

2. Description of the Related Art

With the implementation of the Act on the Protection of Personal Information, leakage of personal information has become a social problem. In particular, there has been a case where personal information is erroneously transmitted to a wrong destination through communication by, for example, facsimile.

As a countermeasure against this problem, some banks have introduced a system to prevent leakage of client information due to facsimile erroneous transmission. Reference may be had to the site, http://www.kyotobank.co.jp/news/pdf/2005_07_21.pdf (accessible as of Oct. 6, 2005). In this system, data is transmitted from a facsimile machine via a local-area network (LAN) in the bank to a facsimile server, where the data is automatically checked with destination information (destination name, facsimile machine number, etc.) registered in advance.

If they match and the destination is a place outside the bank, transmission is temporarily halted and an executive in a transmitting section checks the destination and contents to be transmitted on a personal computer (PC) screen, and then originates a call to a public line.

In this system, however, although the destination information of a place outside the bank is double-checked through an automatic check on the facsimile server and a visual check by human, the source information is checked only through a visual check by human (this operation is not explicitly explained, but it is assumed that the source information is checked through a check of transmission contents by human; absence of a source check is not certain). That is, the transmission source and the transmission destination are checked by human.

In this case, human check may suffice if the number of transmission sources and transmission destinations is relatively small. However, if the number is increased, reliability of human check is decreased, causing problems such that personal information is transmitted to an unintended destination, leading to leakage of the personal information to third parties. Moreover, in this case, there is also a problem that such a human check takes time, thereby impairing a real-time feature of facsimile communication to interfere with business.

Meanwhile, even among sections using a closed corporate network, there is a risk in which a document is erroneously transmitted to a destination (section) not pertinent to personal information written on the document, leading to erroneous leakage of the personal information to third parties without an appropriate process at the section receiving the document image.

Japanese Patent Application Laid-Open Publication No. 2004-289782 discloses a method in which, at the time of IP packet transfer over a network, a source address and a destination address in an IPv6 header of an IP packet are identified, and when interface IDs in the source address and the destination address match with a preset condition, a transfer over the network is permitted or prohibited correspondingly. This interface ID contains information, such as apparatus type, and a manufacture name and apparatus model can be used as filter conditions.

However, this operation can be applied only to a gateway, and cannot be directly applied to a call control server for call connection.

Therefore, other than communication via this gateway, erroneous facsimile transmission cannot be prevented, resulting in a problem that personal information is leaked to third parties.

Normally, when personal information is leaked to third parties through erroneous facsimile transmission, it is desirable that the transmitting operator can be specified.

However, in the conventional technologies explained above, a check to see who is a transmitting operator cannot be performed. Therefore, when a problem of leakage of personal information occurs, it is difficult to specify a transmitting operator, thereby causing the ultimate location of responsibility to be blurred and posing a problem such that a risk of repeating the same error remains.

The problems explained above may occur not only in personal information, but also in corporate confidential information.

On the other hand, in recent years, equipment and systems for transmitting and receiving voice data over a Voice over IP (VoIP) network have started to become widespread. Also, needs for performing facsimile communication over this VoIP network is being increased, and facsimile communication systems have been used, such as the one conforming to International Telecommunication Union-Telecommunication Standardization Sector (ITU-T) Recommendations T.38 optimal to an IP network and the one in a G.711 PassThrough scheme in which a facsimile signal is regarded as a voice signal and is packetized to flow through an IP network.

In an in-company VoIP network in place of Private Branch Exchange (PBX) used in a conventional analog circuit, a call control server is often used, in which a call is switched on an IP-packet base. In this case, a call to be switched is usually an IP-phone call, and there are not so many facsimile calls compared to IP-phone calls. For this reason, when an additional operation is performed only for controlling facsimile calls, it is desired that whether to perform this additional operation be determined based on information from the calling source.

SUMMARY OF THE INVENTION

It is an object of the present invention to at least partially solve the problems in the conventional technology.

According to an aspect of the present invention, a call control server in a communication system that includes a communication terminal that originates and receives a call through the call control server, includes a receiving unit that receives destination information from the communication terminal as a call request, a determining unit that checks an address of the communication terminal and determines based on the destination information whether transmission to a destination terminal is permitted for the communication terminal, and a call connecting unit that originates a call to an address corresponding to the destination information, only when the transmission is permitted, to connect the communication terminal to the destination terminal.

According to another aspect of the present invention, a call control server is used in a communication system that includes a communication terminal that originates and receives a call through the call control server, and a monitor that issues to the call control server a command including information on whether to permit transmission from the communication terminal to a destination terminal based on destination information and an address of the communication terminal extracted from a call-connection message received from the call control server. The call control server includes a receiving unit that receives the call-connection message including the destination information from the communication terminal, an inquiring unit that transmits the call-connection message to the monitor and receives the command from the monitor, and a call connecting unit that originates a call to an address corresponding to the destination information, only when the transmission is permitted by the command, to connect the communication terminal to the destination terminal.

According to still another aspect of the present invention, a call control server is used in a communication system that includes a communication terminal that originates and receives a call through the call control server, and transmits identification information that identifies a user of the communication terminal when originating a call. The call control server includes a receiving unit that receives destination information together with the identification information from the communication terminal as a call request, a determining unit that determines based on the destination information and the identification information whether transmission to a destination terminal is permitted for the communication terminal, and a call connecting unit that originates a call to an address corresponding to the destination information, only when the transmission is permitted, to connect the communication terminal to the destination terminal.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is an example of contents of an alias-IP address association table;

FIG. 5 is an example of contents of a communication-permitted address table;

FIG. 6 is a flowchart of the operation of the call control server;

FIG. 7A is an example of contents of an alias-IP address association table for the IP facsimile machine;

FIG. 7B is an example of contents of an alias-IP address association table for an IP telephone terminal shown in FIG. 1;

FIGS. 8 and 9 are flowcharts of the operation of the call control server;

FIG. 12 is a flowchart of the operation of a monitor shown in FIG. 10;

FIGS. 15A and 15B are examples of contents of a user-level communication-permitted address table;

FIGS. 16 and 17 are flowcharts of the operation of a call control server shown in FIG. 13;

FIG. 18 is an example of contents of a group-level communication-permitted address table;

FIGS. 24 and 25 are flowcharts of the operation of a monitor shown in FIG. 22;

DETAILED DESCRIPTION OF THE PREFERRED EMBODIMENTS

Exemplary embodiments of the present invention are described in detail below with reference to the accompanying drawings.

Figure 1:
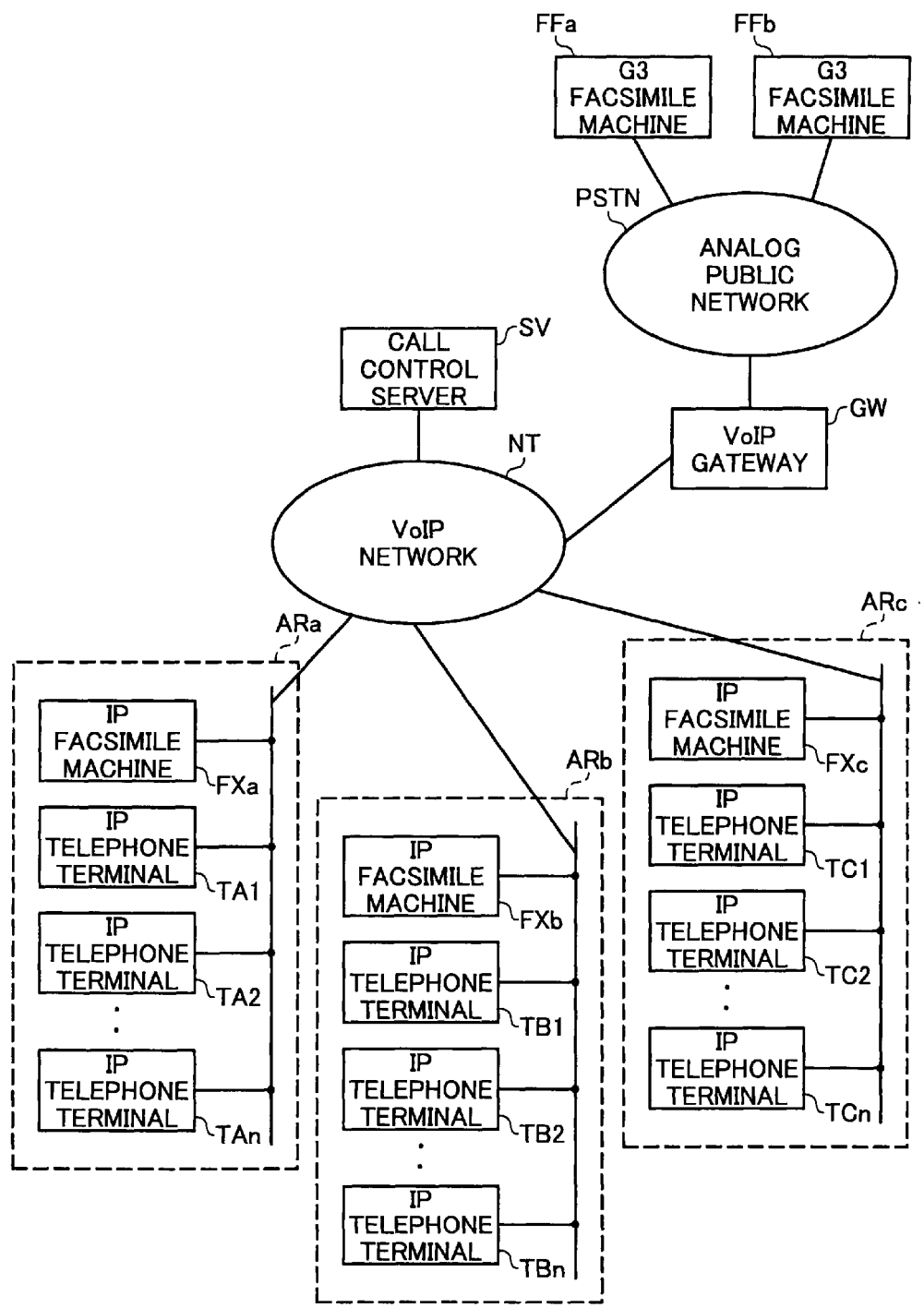
FIG. 1 is a block diagram of a communication system according to one embodiment of the present invention.

FIG. 1 is a block diagram of a communication system according to a first embodiment of the present invention.

This communication system is a system in which voice data, image data of facsimile machines, and others are transmitted and received on a VoIP network NT. The communication system includes a call control server SV, local networks forming areas ARa, ARb, and ARc connected to the VoIP network NT, a VoIP gateway GW for interconnection with the VoIP network NT and an analog public network PSTN, and group-3 facsimile machines FFa and FFb accommodated in the analog public network PSTN.

In the LAN (sub-network) forming the area ARa, a facsimile machine (hereinafter, "IP facsimile machine") FXa conforming to ITU-T Recommendations T.38 and many (for example, on the order of 100) IP telephone terminals TA1 to TAn are connected to one another.

In the LAN (sub-network) forming the area ARb, an IP facsimile machine FXb and many (for example, on the order of 100) IP telephone terminals TB1 to TBAn are connected to one another.

In the LAN (sub-network) forming the area ARc, an IP facsimile machine FXc and many (for example, on the order of 100) IP telephone terminals TC1 to TCn are connected to one another.

Also, the VoIP gateway GW has functions of converting a protocol for use on the VoIP network NT to a protocol for use on the analog public network PSTN and vice visa, and also converting packetized digital data to an analog signal and vice versa.

Therefore, the IP facsimile machines FXa, FXb, and FXc connected to the VoIP network NT can communicate with the group-3 facsimile machines FFa and FFb connected to the analog public network PSTN via the VoIP gateway GW. Also, the IP telephone terminals TA1 to TAn, TB1 to TBn, and TC1 to TCn connected to the VoIP network NT can connect to subscriber telephones (not shown) connected to the analog public network PSTN via the VoIP gateway GW.

Here, the call control server SV, the IP facsimile machines FXa, FXb, and FXc, the IP telephone terminals TA1 to TAn, TB1 to TBn, and TC1 to TCn, and the VoIP gateway GW use ITU-T Recommendations H.323 as a protocol for call control on the VoIP network.

In FIG. 1, a gateway and a router for causing data to flow among different networks (sub-networks) are not depicted.

Figure 2:
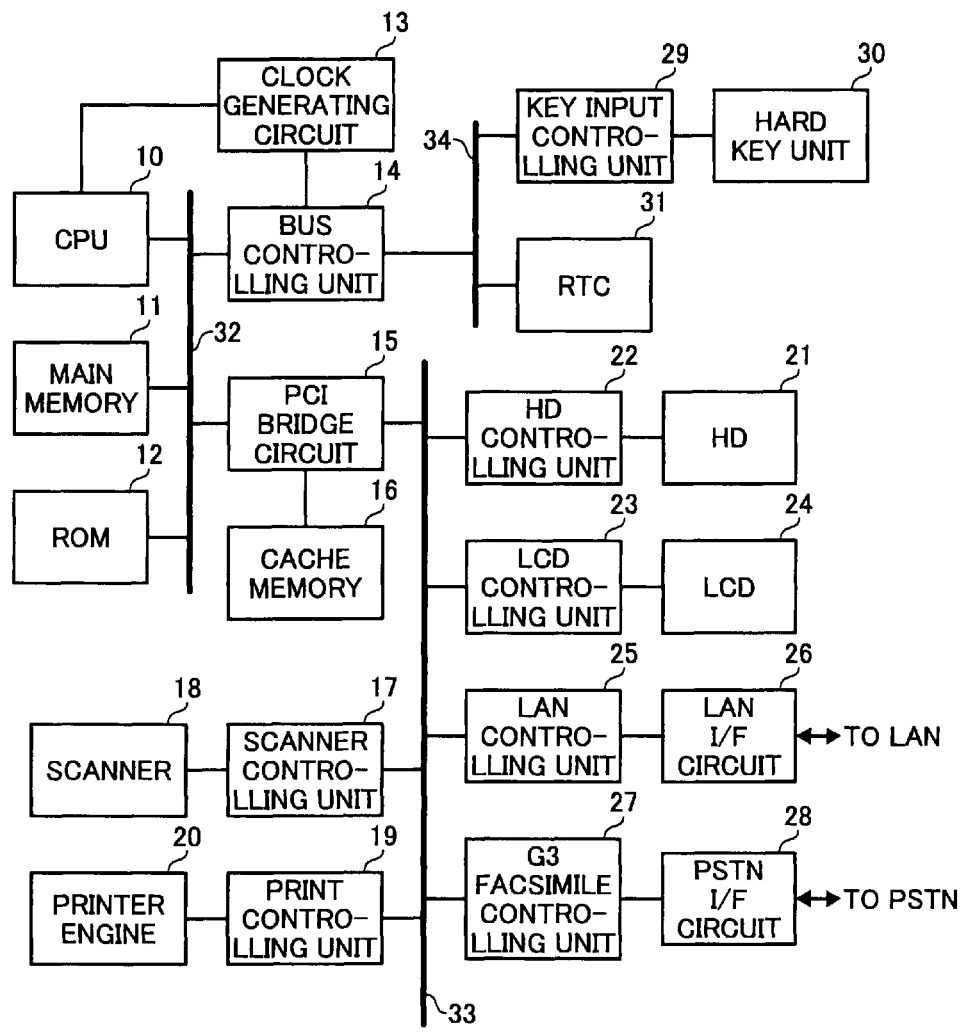
FIG. 2 is a block diagram of an IP facsimile machine shown in FIG. 1.

FIG. 2 is a block diagram of the IP facsimile machine FX (FXa, FXb, FXc).

The IP facsimile machine FX includes, for example, a central processing unit (CPU) 10, a main memory 11, a Read Only Memory (ROM) 12, a clock generating circuit 13, a bus controlling unit 14, a Peripheral Component Interconnect (PCI) bridge circuit 15, a cache memory 16, a scanner controlling unit 17, a scanner 18, a print controlling unit 19, a printer engine 20, a hard disk (HD) 21, an HD controlling unit 22, a liquid crystal display (LCD) controlling unit 23, an LCD 24, a LAN controlling unit 25, a LAN interface circuit 26, a group-3 facsimile controlling unit 27, a Public Switched Telephone Network (PSTN: analog public network) interface circuit 28, a key input controlling unit 29, a hard key unit 30, a Real Time Clock (RTC) 31, a CPU bus 32, a PCI bus 33, and an X bus (internal bus) 34.

The CPU 10 executes and processes a control processing program stored in the ROM 12 and an Operation System (OS). The main memory 11 includes a Dynamic Random Access Memory (DRAM), and is used as a work area of the CPU 10 or the like. The ROM 12 has written in advance therein various programs for starting up the system at the time of power-on and achieving functions of the IP facsimile machine FX.

The clock generating circuit 13 includes a crystal oscillator and a dividing circuit, and generates a clock for controlling the operation timing of the CPU 10 and the bus controlling unit 14. The bus controlling unit 14 controls data transfer on the CPU bus 32 and the X bus 34. The PCI bridge circuit 15 performs data transfer between the PCI bus 33 and the CPU 10 by using the cache memory 16. The cache memory 16 includes a DRAM, and is used by the PCI bridge circuit 15.

The scanner controlling unit 17 controls a document reading operation of the scanner 18. The scanner 18 reads an image on paper by a charge-coupled-device (CCD) line sensor. The print controlling unit 19 controls the operation of the printer engine 20. The printer engine 20 uses toner to generate a monochrome image on paper.

The HD 21 stores image data received through communication when the IP facsimile machine runs out of print recording paper. The HD controlling unit 22 has, for example, an Integrated Device Electronics (IDE) interface as an interface with the HD 21 for high-speed data transmission with the HD 21.

The LCD controlling unit 23 performs Digital-to-Analog (D/A) conversion on character data, graphic data, and others, and also performs control for displaying such data on the LCD 24. The LAN controlling unit 25 executes a communication protocol complying with, for example, Institute of Electrical and Electronics Engineers (IEEE) 802.3 standard, and controls communication with another device connected to the Ethernet via the LAN interface circuit 26.

The group-3 facsimile controlling unit 27 transmits and receives a group-3 facsimile modem signal by a modem incorporated therein and also performs compression and decompression of facsimile image data.

The key input controlling unit 29 converts serial data input from the hard key unit 30 to parallel data. The RTC 31 is a daily clock, and is backed up by a battery not shown.

Here, regarding processes for which any hardware component is not explicitly explained, the CPU 10 executes a control process program stored in the ROM 12 using the main memory 11 as a work area.

Figure 3:
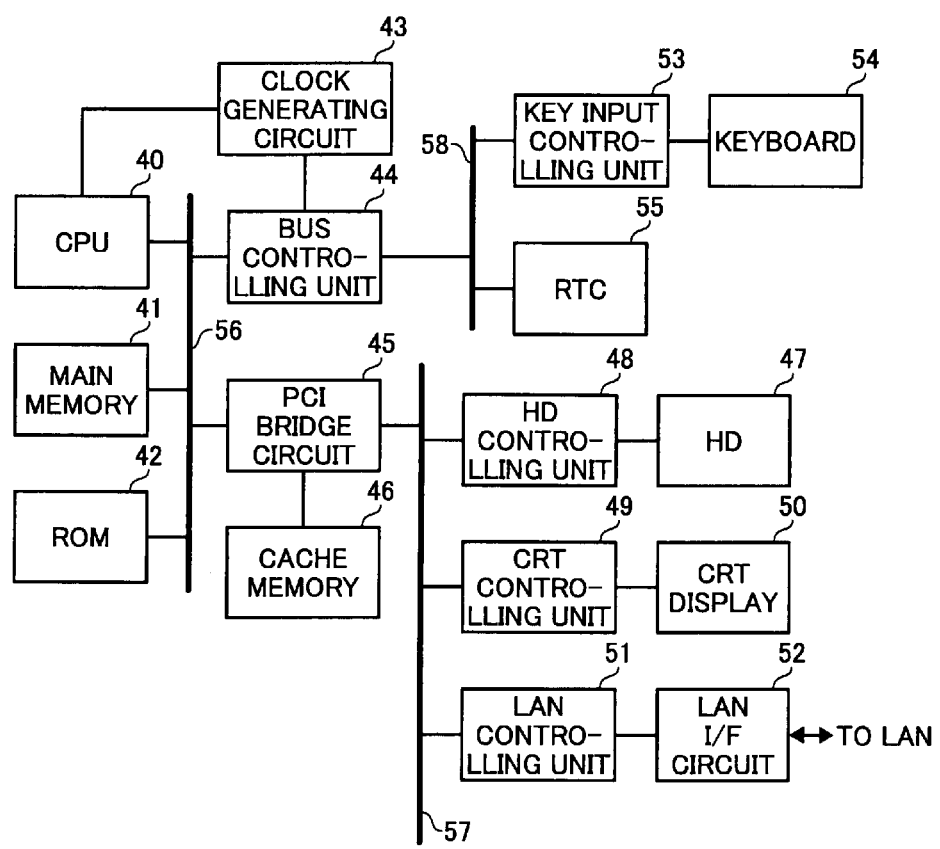
FIG. 3 is a block diagram of a call control server shown in FIG. 1.

FIG. 3 is a block diagram of the call control server SV. The call control server SV is connected to the VoIP network NT via a LAN not shown.

The call control server SV includes, for example, a CPU 40, a main memory 41, a ROM 42, a clock generating circuit 43, a bus controlling unit 44, a PCI bridge circuit 45, a cache memory 46, an HD 47, an HD controlling unit 48, a cathode-ray tube (CRT) controlling unit 49, a CRT display 50, a LAN controlling unit 51, a LAN interface circuit 52, a key input controlling unit 53, a keyboard 54, an RTC 55, a CPU bus 56, a PCI bus 57, and an X bus 58.

The CPU 40 executes and processes a control processing program stored in the ROM 42 and an OS. The main memory 41 includes a DRAM, and is used as a work area of the CPU 40 or the like. The ROM 42 has written in advance therein various programs for starting up the system at the time of power-on and achieving functions of the call control server SV.

The clock generating circuit 43 includes a crystal oscillator and a dividing circuit, and generates a clock for controlling the operation timing of the CPU 40 and the bus controlling unit 44. The bus controlling unit 44 controls data transfer on the CPU bus 56 and the X bus 58. The PCI bridge circuit 45 performs data transfer between the PCI bus 57 and the CPU 40 by using the cache memory 46. The cache memory 46 includes a DRAM, and is used by the PCI bridge circuit 45.

The HD 47 stores various data (such as program data, address data for call connection, various setting data, and work data). The HD controlling unit 48 has, for example, an Integrated Device Electronics (IDE) interface as an interface with the HD 47 for high-speed data transmission with the HD 47.

The CRT controlling unit 49 performs D/A conversion on character data, graphic data, and others, and also performs control for displaying such data on the CRT display 50. The LAN controlling unit 51 executes a communication protocol complying with, for example, IEEE 802.3 standard, and controls communication with another device connected to the Ethernet via the LAN interface circuit 52.

The key input controlling unit 53 converts serial data input from the keyboard 54 to parallel data. The RTC 31 is a daily clock, and is backed up by a battery not shown.

Here, regarding processes for which any hardware component is not explicitly explained, the CPU 40 executes a control process program stored in the ROM 42 using the main memory 41 as a work area.

Also, the call control server SV has stored therein a association table depicting a relation between telephone numbers (number sequences of 0 to 9 following a known telephone number providing system; which are referred to as alias numbers) and IP addresses of the IP facsimile machines FXa, FXb, and FXc, and the IP telephone terminals TA1 to TAn, TB1 to TBn, and TC1 to TCn (such a table is referred to as an alias-IP address association table; refer to FIG. 4), and a combination table depicting combinations of a source IP address and a destination alias number among any of the IP facsimile machines FXa, FXb, and FXc for which communication is permitted (such a table is referred to as a communication-permitted address table; refer to FIGS. 5A and 5B). A system administrator can change and add new data to the data in these tables, as appropriate.

The IP facsimile machines FXa, FXb, and FXc and the IP telephone terminals TA1 to TAn, TB1 to TBn, and TC1 to TCn are each provided with an alias number starting with a number other than 0. The telephone number of a subscriber telephone connected to the analog public network PSTN (0AB to J number; a telephone number starting with 0) is used as it is as an alias number.

It is assumed that, in this case, communication from the IP facsimile machine FXa to the IP facsimile machine FXc and the group-3 facsimile machine FFa is set as being permitted, whilst communication from the IP facsimile machine FXa to the IP facsimile machine FXb and the group-3 facsimile machine FFb is set as being not permitted.

First, the case is explained in which a connection is established from the IP facsimile machine FXa to the IP facsimile machine FXc for communication.

The IP facsimile machine FXa sets the alias number of the IP facsimile machine FXc in destinationAddress, which is a parameter of Setup-UUIE to be included in a user-user information element of a Setup message, and then transmits the result to the call control server SV.

Upon receiving this Setup message, the call control server SV acquires the alias number, which is a value of destinationAddress included in this message, and also acquires the IP address of the IP facsimile machine FXa, which is the transmission source, from the header of a Transmission Control Protocol (TCP) packet with which this Setup message is sent, thereby checking whether a combination of this IP address and the destination alias number is in the communication-permitted address table.

When confirming that this address combination is in the communication-permitted address table, the call control server SV acquires a destination IP address by referring to the alias-IP address association table.

Then, the call control server SV calls the IP address to connect the IP facsimile machine FXc, and then returns a Connect message, which is a normal response, to the IP facsimile machine FXa to connect a channel for facsimile communication between the IP facsimile machine FXa and the IP facsimile machine FXc, thereby performing facsimile communication complying with ITU-T Recommendations T.38.

Next, the case is explained in which a connection is established from the IP facsimile machine FXa to the group-3 facsimile machine FFa for communication.

The IP facsimile machine FXa, as with the above, sets the alias number of the group-3 facsimile machine FFa (which is identical to a subscriber telephone number of the group-3 facsimile machine FFa) in destinationAddress, which is a parameter of the Setup message, and then transmits the result to the call control server SV.

Upon receiving this Setup message, the call control server SV acquires the alias number, which is a value of destinationAddress included in this message, and also acquires the IP address of the IP facsimile machine FXa, which is the transmission source, from the header of a TCP packet with which this Setup message is sent, thereby checking whether a combination of this IP address and the destination alias number is in the communication-permitted address table.

When confirming that this address combination is in the communication-permitted address table, the call control server SV checks to see whether the alias number starts with 0. Since the alias number starts with 0, the call control server SV sets the alias number of the group-3 facsimile machine FFa in destinationAddress, which is a parameter of the Setup message, and then transmits the result to the VoIP gateway GW.

When the alias number starts with 0, the call control server SV always issues a call request to the VoIP gateway GW.

When calling the alias number included in the Setup message to connect to the group-3 facsimile machine FFa, the VoIP gateway GW returns a Connect message, which is a normal response, to the call control server SV.

Then, the call control server SV returns a Connect message to the IP facsimile machine FXa. The IP facsimile machine FXa then performs facsimile communication with the group-3 facsimile machine FFa via the VoIP gateway GW.

Next, the case is explained in which a connection is tried to be established from the IP facsimile machine FXa to the IP facsimile machine FXb.

The IP facsimile machine FXa, as with the above, sets the alias number of the IP facsimile machine FXb in destinationAddress, which is a parameter of the Setup message, and then transmits the result to the call control server SV.

Upon receiving this Setup message, the call control server SV acquires the alias number, which is a value of destinationAddress included in this message, and also acquires the IP address of the IP facsimile machine FXa, which is the transmission source, from the header of a TCP packet with which this Setup message is sent, thereby checking whether a combination of this IP address and the destination alias number is in the communication-permitted address table.

Since this combination is not in the communication-permitted address table, the call control server SV returns a Release Complete message meaning connection rejection to the IP facsimile machine FXa, and does not establish a connection with the IP facsimile machine FXb.

An operation flow of the call control server SV in this case is depicted in FIG. 6.

Upon receiving a Setup message (YES at step S101), it is checked whether a combination of the source IP address and the destination alias number is in the communication-permitted address table (step S102).

If this combination is not in the table (NO at step S103), a Release Complete message is returned to the IP facsimile machine FX, which is the call requester (step 104), and then the process ends at this time.

On the other hand, if this combination is in the table (YES at step S103), it is checked whether the alias number starts with 0 (step S105). If the result of step S105 is NO, a destination IP address is acquired by referring to the alias-IP address association table (step S106).

Then, the IP address is called to connect to the IP facsimile machine FX, and then a Connect message is returned to the call-requester IP facsimile machine FX (step S107). With this, an operation of transmitting predetermined image data is performed between the call-requester IP facsimile machine FX and the destination IP facsimile machine FX (step S108).

Then, when the image-data transmitting operation ends, the connection for call control is disconnected (step S109), and the operation ends at this time.

On the other hand, when the result of step S105 is YES, the VoIP gateway GW is determined as a connection destination (step S110). Then, the IP address of the VoIP gateway GW is called to connect to a group-3 facsimile machine ahead thereof, and then a Connect message is returned to the call-requester IP facsimile machine FX (step S111).

With this, an operation of transmitting predetermined image data is performed via the VoIP gateway GW between the call-requester IP facsimile machine FX and the destination group-3 facsimile machine (step S112).

Then, when the image-data transmitting operation ends, the procedure goes to step S109, the connection for call control is disconnected, and the operation ends at this time.

In the above description, the case has been explained in which the IP address of the source terminal is acquired from the header of the TCP packet. Alternatively, at the source terminal, its IP address can be put in sourceCallSignalAddress, which is a parameter of Setup-UUIE to be included in a user-user information element of a Setup message, for transmission and, from this parameter, the call control server SV can acquire the IP address of the source terminal.

In this manner, in the embodiment, since a check on a transmission source and a transmission destination is automatically performed at the call control server, human error that might occur when the transmission source and the transmission destination are visually checked, as has been conventionally performed, can be prevented. Also, erroneous leakage of personal information or corporate secret to third parties due to erroneous transmission can be prevented.

Meanwhile, the call control server SV receives a connection request not only from the IP facsimile machine FX but also from an IP telephone terminal. In the communication system of FIG. 1, if permission or denial of connection with only any IP facsimile machine FX is desired, a determination of whether the connection is permitted is made only when the source IP address is an IP address of an IP facsimile machine FX.

In a second embodiment, as depicted in FIGS. 7A and 7B, the call control server SV manages an alias-IP address association table for IP telephone terminals and that for IP facsimile machines FX separately.

The case is explained in which a connection is established from the IP facsimile machine FXa to the IP facsimile machine FXc for communication.

The IP facsimile machine FXa sets the alias number of the IP facsimile machine FXc in destinationAddress, which is a parameter of a Setup message, and then transmits the result to the call control server SV.

Upon receiving this Setup message, the call control server SV acquires the IP address of the source IP facsimile machine FXa from the header of the TCP packet with which this Setup message is sent. Then, it is checked which alias-IP address association table this IP address is in, that is, the one for IP telephone terminals or the one for IP facsimile machines FX.

If it is determined that this IP address is in the one for IP facsimile machines FX, the alias number, which is a value of destinationAddress included in the Setup message previously received, is acquired, and then it is checked whether a combination of this alias number and the IP address previously acquired is in the communication-permitted address table.

When confirming that this address combination is in the communication-permitted address table, the call control server SV acquires a destination IP address by referring to the alias-IP address association table for IP facsimile machines FX.

Then, the call control server SV calls the IP address to connect to the IP facsimile machine FXc, and then returns a Connect message, which is a normal response, to the IP facsimile machine FXa to connect a channel for facsimile communication between the IP facsimile machine FXa and the IP facsimile machine FXc, thereby performing facsimile communication complying with ITU-T Recommendations T.38.

On the other hand, if the IP address of transmission source of the Setup message received by the call control server SV is for IP telephone terminals, an alias number, which is a value of destinationAddress included in the Setup message is acquired, and then the destination IP address is acquired by referring to the alias-IP address association table for IP telephone terminals.

Then, the call control server SV calls the IP address to connect to the IP telephone terminal, and then returns a Connect message, which is a normal response, to the source IP telephone terminal. Then, a channel for voice is connected between IP telephone terminals for transmission and reception of voice data.

An operation flow of the call control server SV in this case is depicted in FIGS. 8 and 9.

Upon receiving a Setup message (YES at step S201), it is checked whether the source IP address is in the alias-IP address association table for IP facsimile machines FX (step S202).

If the result of step S202 is YES, it is checked whether a combination of the source IP address and the destination alias number is in the communication-permitted address table (step S203).

If this combination is not in the table (NO at step S204), a Release Complete message is returned to the call-requester IP facsimile machine FX (step S205), and then the process ends at this time.

On the other hand, if this combination is in the table (YES at step S204), a destination IP address is acquired by referring to the alias-IP address association table (step S206).

Then, the IP address is called to connect to the IP facsimile machine FX, and then a Connect message is returned to the call-requester IP facsimile machine FX (step S207). With this, an operation of transmitting predetermined image data is performed between the call-requester IP facsimile machine FX and the destination IP facsimile machine FX (step S208).

Then, when the image-data transmitting operation ends, the connection for call control is disconnected (step S209), and the operation ends at this time.

On the other hand, if the result of step S202 is NO, a destination IP address is acquired by referring to the alias-IP address association table for IP telephone terminals (step S210). Next, the IP address is called to connect to the IP telephone terminal, and then a Connect message is returned to the call-requester IP telephone terminal (step S211).

With this, voice data is transmitted between IP telephone terminals (step S212), and a call-end operation is waited (NO at step S213). When a call-end operation is performed (YES at step S213), the connection for call control is disconnected (step S214), and the operation ends at this time.

In this manner, in the embodiment, an additional operation is performed only when the calling terminal is a facsimile machine. With this, the load on an operation process of the call control server can be reduced.

Figure 10:
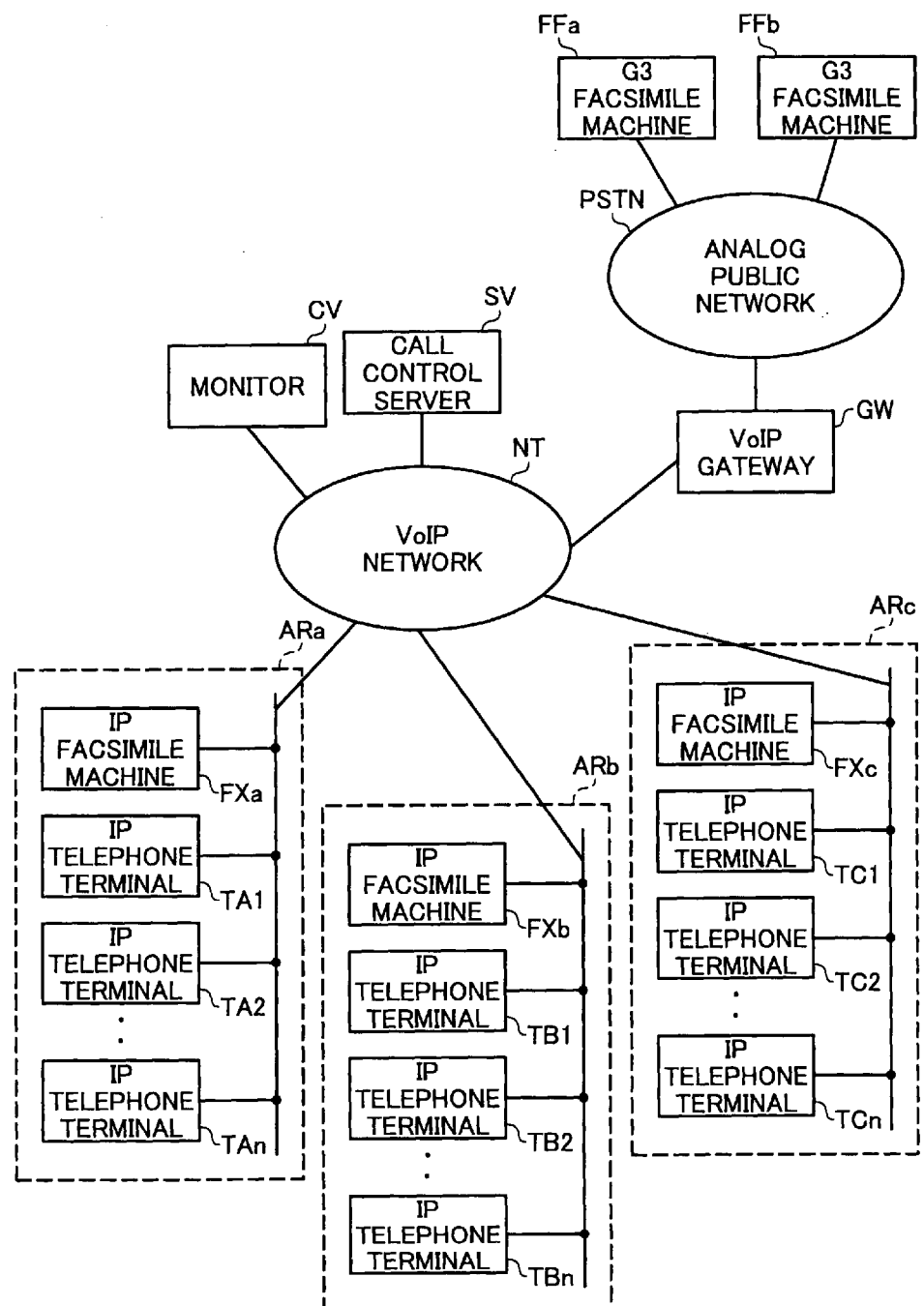
FIG. 10 is a block diagram of a communication system according to another embodiment of the present invention.

FIG. 10 is a block diagram of a communication system according to a third embodiment of the present invention. In FIG. 10, components corresponding to those in FIG. 1 are designated by the same reference numerals, and are not explained herein.

In the embodiment, the VoIP network NT is provided with a monitor CV. In place of the call control server SV, this monitor CV determines whether to permit connection. Also, the monitor CV has a configuration similar to that of the call control server SV depicted in FIG. 3, and a connection monitoring application is implemented. The operation of the monitor CV explained below is operated and performed by this connection monitoring application.

In this case, the call control server SV has implemented therein a Hypertext Transfer Protocol (HTTP) server function and a Java Telephony Application Programming Interface (JTAPI: refer to http://java.sun.com/products/jtapi/index.jsp). The connection monitoring application of the monitor CV uses an HTTP command and JTAPI to perform an operation in conjunction with the call control server SV.

The monitor CV first uses a JtapiPeerFactory class provided by JTAPI to generate JtapiPeer object and, with a getProvider( ) method, performs registration on the call control server SV. With this, the monitor CV can receive various events from the call control server SV.

The monitor CV has stored therein a combination table depicting combinations of a source IP address and a destination alias number among any of the IP facsimile machines FXa, FXb, and FXc for which communication is permitted (communication-permitted address table; refer to FIG. 5). A system administrator can change and add new data to the data in these tables, as appropriate.

The case is explained in which a connection is established from the IP facsimile machine FXa to the IP facsimile machine FXc for communication.

The IP facsimile machine FXa sets the alias number of the IP facsimile machine FXc in destinationAddress, which is a parameter of a Setup message, and also sets the IP address of its own in SourceCallSignalAddress, and then transmits the result to the call control server SV.

Upon receiving this Setup message, the call control server SV issues an incoming-call notification to the monitor CV. Upon receiving this notification, the monitor CV issues to the call control server SV a command of requesting acquisition of Setup message data. This command is transmitted by using a GET method in HTTP.

Upon receiving this command, the call control server SV passes the Setup message data to the monitor CV as being included in a HTTP "200 OK" response. Upon receiving this Setup message, the monitor CV acquires the alias number, which is a value of destinationAddress included in this message, and the IP address included in sourceCallSignalAddress, and checks whether a combination of these IP address and destination alias number is in the communication-permitted address table. When confirming that this address combination is in the communication-permitted address table, a command for permitting connection is transmitted to the call control server SV. This command is transmitted by using a POST method in HTTP.

Upon receiving this command, the call control server SV acquires the alias number, which is a value of destinationAddress included in the Setup message previously received, and then acquires a destination IP address by referring to the alias-IP address association table. Then, the IP address is called to connect to the IP facsimile machine FXc, and then a Connect message, which is a normal response, is returned to the IP facsimile machine FXa to connect a channel for facsimile communication between the IP facsimile machine FXa and the IP facsimile machine FXc, thereby performing facsimile communication complying with ITU-T Recommendations T.38.

Next, the case is explained in which a connection is tried to be established from the IP facsimile machine FXa to the IP facsimile machine FXb, for which connection is not permitted.

The IP facsimile machine FXa, as with the above, sets the alias number of the IP facsimile machine FXb in destinationAddress, which is a parameter of a Setup message, and also sets the IP address of its own in SourceCallSignalAddress, and then transmits the result to the call control server SV.

Upon receiving this Setup message, the call control server SV passes the data of this message to the monitor CV in a manner similar to the above. Upon receiving this Setup message, the monitor CV acquires the alias number, which is a value of destinationAddress included in this message, and the IP address included in sourceCallSignalAddress, and checks whether a combination of these IP address and destination alias number is in the communication-permitted address table. Here, since such a combination is not in the communication-permitted address table, a command for not permitting connection is transmitted to the call control server SV.

Upon receiving this command, the call control server SV returns a Release Complete message meaning connection rejection to the IP facsimile machine FXa, and does not establish a connection with the IP facsimile machine FXb.

Figure 11B:
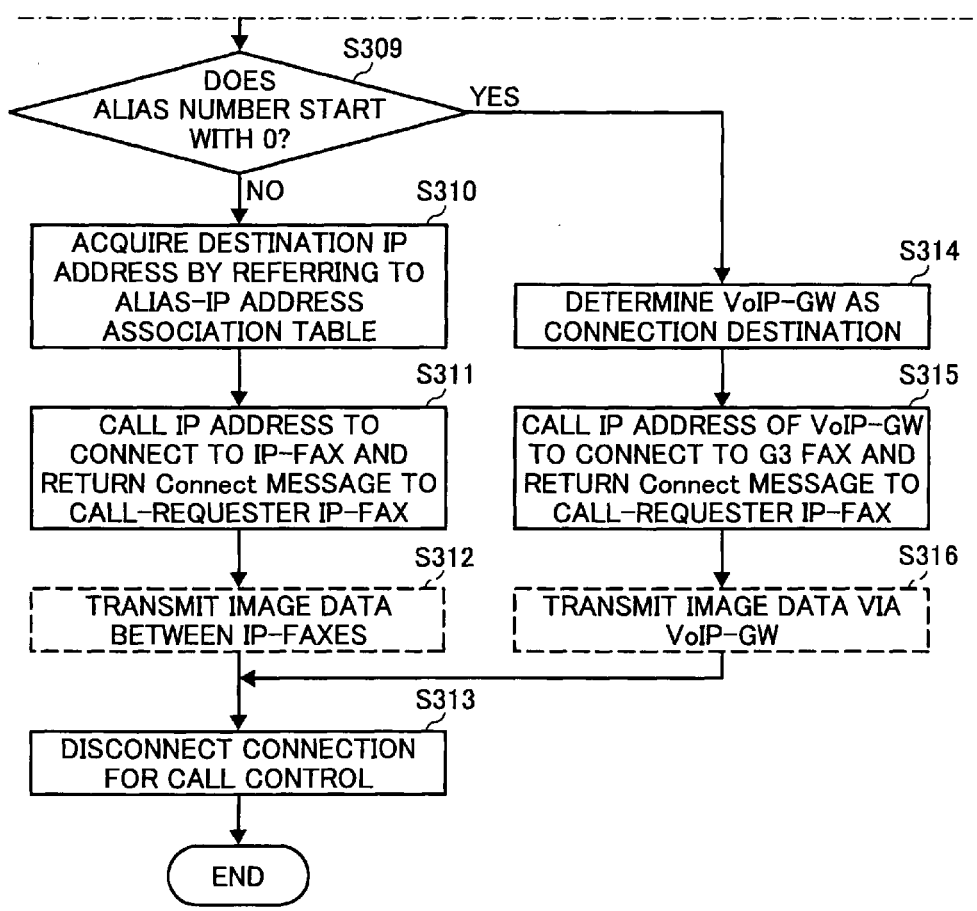
FIG. 11 is a flowchart of the operation of a call control server shown in FIG. 10.

An operation flow of the call control server SV in this case is depicted in FIG. 11, whilst an operation flow of the monitor CV is depicted in FIG. 12.

In FIG. 11, upon receiving this Setup message (YES at step S301), the call control server SV issues an incoming-call notification to the monitor CV (step S302), and waits until a Setup data acquisition request command is received from the monitor CV (NO at step S303). When the result of step S303 is YES, the call control server SV passes the Setup message data to the monitor CV (step S304), and then waits until a connection permit information command is received from the monitor CV (NO at step S305).

When the result of step S305 becomes YES, the connection permit information command is examined to check whether connection has been permitted (step S306). If the result of step S306 is NO, Release Complete message is returned to the IP facsimile machine FX, which is the call requester (step S307), and then the process ends at this time.

If connection has been permitted (YES at step S306), the alias number is acquired from the Setup message previously received (step S308), and it is checked whether the alias number starts with 0 (step S309).

When the result of step S309 is NO, a destination IP address is acquired by referring to the alias-IP address association table (step S310).

Then, the IP address is called to connect to the IP facsimile machine FX, and then a Connect message is returned to the call-requester IP facsimile machine FX (step S311). With this, an operation of transmitting predetermined image data is performed between the call-requester IP facsimile machine FX and the destination IP facsimile machine FX (step S312).

Then, when the image-data transmitting operation ends, the connection for call control is disconnected (step S313), and the operation ends at this time.

On the other hand, when the result of step S309 is YES, the VoIP gateway GW is determined as a connection destination (step S314). Then, the IP address of the VoIP gateway GW is called to connect to a group-3 facsimile machine ahead thereof, and then a Connect message is returned to the call-requester IP facsimile machine FX (step S315).

With this, an operation of transmitting predetermined image data is performed via the VoIP gateway GW between the call-requester IP facsimile machine FX and the destination group-3 facsimile machine (step S316).

Then, when the image-data transmitting operation ends, the procedure goes to step S313, where the connection for call control is disconnected, and the operation ends at this time.

Also, in FIG. 12, upon receiving an incoming-call notification from the call control server SV (YES at step S401), the monitor CV issues to the call control server SV a Setup data acquisition request command (step S402).

Then, the monitor CV waits until the Setup message data is received from the call control server SV (NO at step S403). When the result of step S403 is YES, the data of the received Setup message is examined to check whether a combination of the source IP address and the destination alias number is in the communication-permitted address table (step S404).

If this combination is in the table (YES at step S405), a connection permit command is issued to the call control server SV (step S406), and then the operation ends at this time. Also, if this combination is not in the table and the result of step S405 is NO, a connection deny command is issued to the call control server SV (step S407), and then the operation ends at this time.

In this manner, in the embodiment, a check on the transmission source and the transmission destination is performed at the monitor, which is outside of the call control server. With this, the load on an operation process of the call control server can be reduced.

Meanwhile, in the communication system of FIG. 10, if permission or denial of connection with only any IP facsimile machine FX is desired, a determination of whether the connection is permitted is made only when the source IP address is an IP address of an IP facsimile machine FX.

In this case, as explained in the second embodiment, the call control server SV manages an alias-IP address association table for IP telephone terminals and that for IP facsimile machine FX separately.

The operation in this case is explained next as a fourth embodiment.

The IP facsimile machine FXa sets the alias number of the IP facsimile machine FXc in destinationAddress, which is a parameter of a Setup message, and then transmits the result to the call control server SV.

Upon receiving this Setup message, the call control server SV acquires the IP address of the source IP facsimile machine FXa from the header of the TCP packet with which this Setup message is sent. Then, it is checked which alias-IP address association table this IP address is in, that is, the one for IP telephone terminals or the one for IP facsimile machines FX. If it is determined that this IP address is in the one for IP facsimile machines FX, an incoming-call notification is issued to the monitor CV.

Upon receiving this notification, the monitor CV issues to the call control server SV a command of requesting acquisition of Setup message data. This command is transmitted by using a GET method in HTTP.

Upon receiving this command, the call control server SV passes the Setup message data to the monitor CV as being included in a HTTP "200 OK" response. The operation of the call control server SV and the operation of the monitor CV are similar to those explained in the third embodiment, and therefore details are not explained herein.

On the other hand, if the source IP address is for IP telephone terminals, the call control server SV does not issue an incoming-call notification to the monitor CV, but acquires the alias number, which is a value of destinationAddress included in the Setup message, and acquires a destination IP address by referring to the alias-IP address association table for IP telephone terminals.

Then, the call control server SV calls the IP address to connect to the IP telephone terminal, and then returns a Connect message, which is a normal response, to the source IP telephone terminal. Then, a channel for voice is connected between IP telephone terminals for transmission and reception of voice data.

Meanwhile, a determination of whether the connection is permitted is made for each operator (user) performing a transmitting operation of the IP facsimile machine FX. Such a case is explained next as a fifth embodiment.

Figure 13:
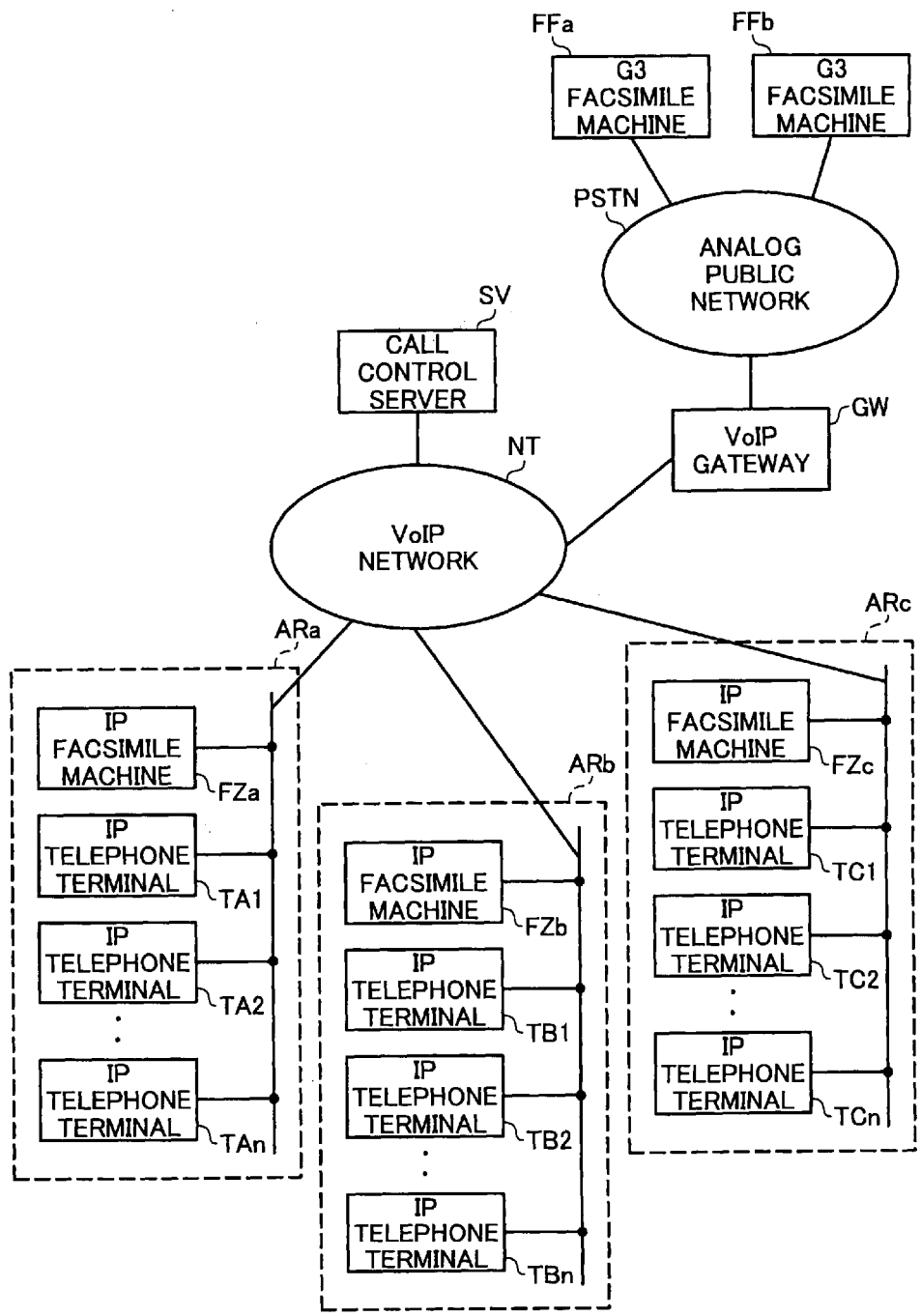
FIG. 13 is a block diagram of a communication system according to still another embodiment of the present invention.

FIG. 13 is a block diagram of a communication system according to the fifth embodiment of the present invention. In FIG. 13, components corresponding to those in FIG. 1 are designated by the same reference numerals. The configuration in this case is different from the configuration of FIG. 1 in that a function of identifying an operator (user) performing a transmitting operation is provided to the IP facsimile machines FZa, FZb, and FZc provided in the areas ARa, ARb, and ARc, respectively.

Figure 14:
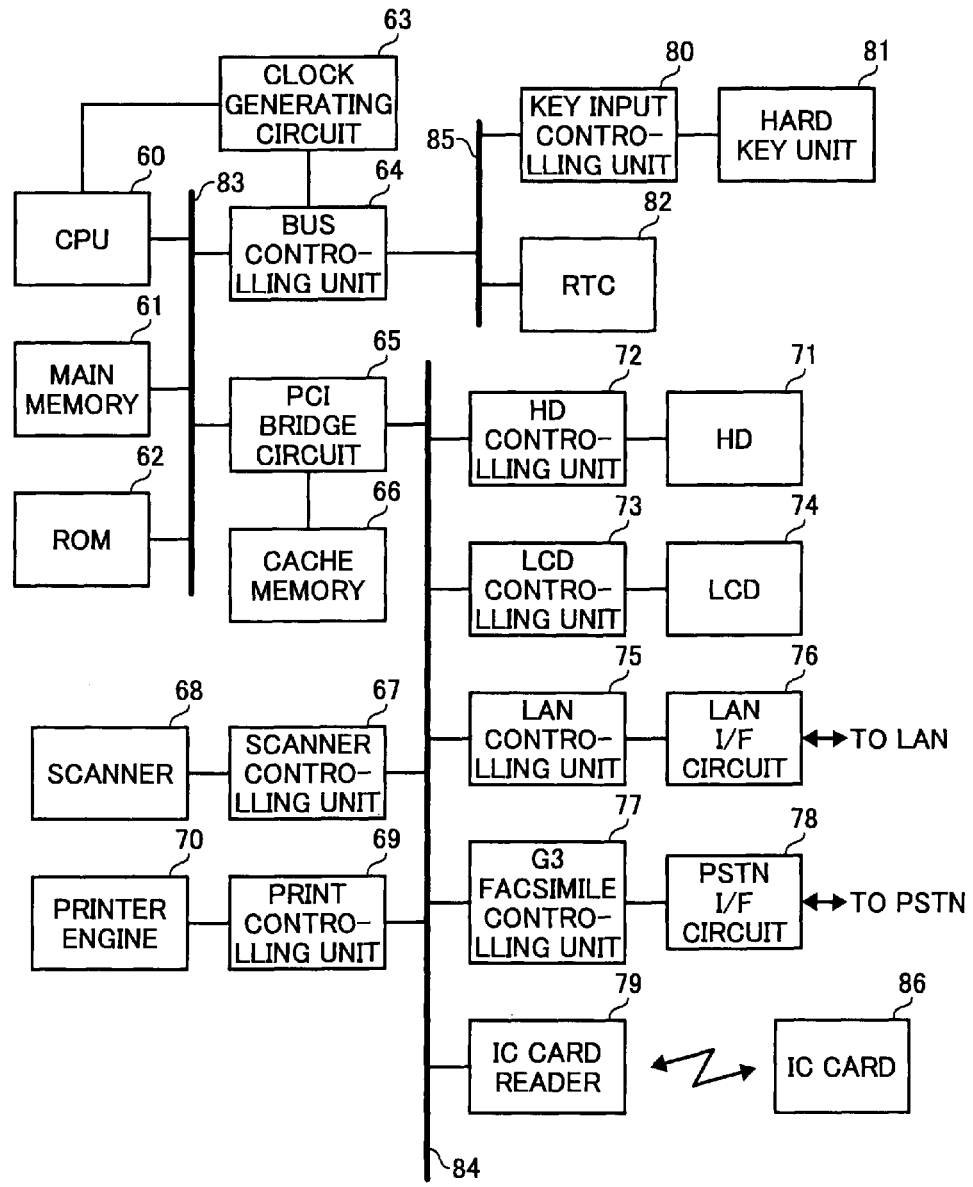
FIG. 14 is a block diagram of an IP facsimile machine shown in FIG. 13.

An example of configuration of this IP facsimile machine FZ (FZa, FZb, FZc) is depicted in FIG. 14.

The IP facsimile machine FZ includes, for example, a CPU 60, a main memory 61, a ROM 62, a clock generating circuit 63, a bus controlling unit 64, a PCI bridge circuit 65, a cache memory 66, a scanner controlling unit 67, a scanner 68, a print controlling unit 69, a printer engine 70, an HD 71, an HD controlling unit 72, an LCD controlling unit 73, an LCD 74, a LAN controlling unit 75, a LAN interface circuit 76, a group-3 facsimile controlling unit 77, a PSTN interface circuit 78, an integrated-circuit (IC) card reader 79, a key input controlling unit 80, a hard key unit 81, an RTC 82, a CPU bus 83, a PCI bus 84, and an X bus 85.

The CPU 60 executes and processes a control processing program stored in the ROM 62 and an OS. The main memory 61 includes a DRAM, and is used as a work area of the CPU 60 or the like. The ROM 62 has written in advance therein various programs for starting up the system at the time of power-on and achieving functions of the IP facsimile machine FZ.

The clock generating circuit 63 includes a crystal oscillator and a dividing circuit, and generates a clock for controlling the operation timing of the CPU 60 and the bus controlling unit 64. The bus controlling unit 64 controls data transfer on the CPU bus 83 and the X bus 85. The PCI bridge circuit 65 performs data transfer between the PCI bus 84 and the CPU 60 by using the cache memory 66. The cache memory 66 includes a DRAM, and is used by the PCI bridge circuit 65.

The scanner controlling unit 67 controls a document reading operation of the scanner 68. The scanner 68 reads an image on paper by a charge-coupled-device (CCD) line sensor. The print controlling unit 69 controls the operation of the printer engine 70. The printer engine 70 uses toner to generate a monochrome image on paper.

The HD 71 stores image data received through communication when the IP facsimile machine runs out of print recording paper. The HD controlling unit 72 has, for example, an IDE interface as an interface with the HD 71 for high-speed data transmission with the HD 71.

The LCD controlling unit 73 performs D/A conversion on character data, graphic data, and others, and also performs control for displaying such data on the LCD 74. The LAN controlling unit 75 executes a communication protocol complying with, for example, IEEE 802.3 standard, and controls communication with another device connected to the Ethernet via the LAN interface circuit 76.

The group-3 facsimile controlling unit 77 transmits and receives a group-3 facsimile modem signal by a modem incorporated therein and also performs compression and decompression of facsimile image data.

The IC card reader 79 wirelessly reads a user code recorded on a contactless IC card.

The key input controlling unit 80 converts serial data input from the hard key unit 81 to parallel data. The RTC 82 is a daily clock, and is backed up by a battery not shown.

An IC card 86 is a contactless IC card having incorporated therein a non-volatile memory and a wireless communication chip, and meets, for example, FeliCa (Sony's registered trademark) specifications. In this case, communication between the IC card 86 and the IC card reader 79 is performed via a radio wave of 13.56 megahertz, and they can be separated up to approximately 10 centimeters apart from each other.

Here, regarding processes for which any hardware component is not explicitly explained, the CPU 60 executes a control process program stored in the ROM 62 using the main memory 61 as a work area.

In the embodiment, the operator (user) of the IP facsimile machine FZ has the IC card 86 having recorded thereon a user code, which is an identification number of each user, and uses this IC card 86 to perform various operations of the IP facsimile machine FZ.

That is, in a wait state without any operation from the operator, the IP facsimile machine FZ is in a non-active mode of not accepting any operation of the operator. When the user code is read from the IC card 86, this mode is removed, and an operation of the operator is accepted.

The call control server SV has stored therein a association table depicting a relation between alias numbers and IP addresses of all IP telephone terminals and IP facsimile machines FZ (such a table is referred to as an alias-IP address association table; refer to FIG. 4), and a combination table depicting combinations of a source IP address, a sender's user code, and a destination alias number among any of the IP facsimile machines FZa, FZb, and FZc for which communication is permitted for each operator (such a table is referred to as a user-level communication-permitted address table; refer to FIG. 15A).

In FIG. 15A, only one destination alias number is provided for a sender's user code. Alternatively, a plurality of destination alias numbers can be registered for each user code. A system administrator can change and add new data to the data in these tables, as appropriate.

Next, the case is explained in which a connection is established from the IP facsimile machine FZa to the IP facsimile machine FZc for communication.

When the operator holds the IC card 86 over the vicinity of the IC card reader 79 of the IP facsimile machine FZa, the IC card reader 79 wirelessly reads the user code recorded on the IC card 86.

The IP facsimile machine FZa stores this user code in the main memory 61 and also removes the non-active mode. Then, when the operator performs an operation of transmission to the IP facsimile machine FZc, the IP facsimile machine FZa sets the alias number of the IP facsimile machine FZc in destinationAddress, which is a parameter of Setup-UUIE to be included in a user-user information element of a Setup message, and also sets the user code in conferenceID, which is a parameter of Setup-UUIE, and then transmits the result to the call control server SV.

Here, conferenceID is originally a conference ID for use in teleconference, but since no teleconference is performed on the IP facsimile machine FZ, this parameter is used for a user code.

Upon receiving this Setup message, the call control server SV acquires the alias number, which is a value of destinationAddress, and the user code, which is a value of conferenceID, included in this message, and also acquires the IP address of the IP facsimile machine FZa, which is the transmission source, from the header of a TCP packet with which this Setup message is sent, thereby checking whether a combination of this IP address, the user code (identification information for identifying the operator), and the destination alias number is in the user-level communication-permitted address table.

When confirming that this combination is in the user-level communication-permitted address table, the call control server SV acquires a destination IP address by referring to the alias-IP address association table.

Then, the call control server SV calls the IP address to connect to the IP facsimile machine FZc, and then returns a Connect message, which is a normal response, to the IP facsimile machine FZa to connect a channel for facsimile communication between the IP facsimile machine FZa and the IP facsimile machine FZc, thereby performing facsimile communication complying with ITU-T Recommendations T.38.

An operation flow of the call control server SV in this case is depicted in FIG. 16.

Upon receiving a Setup message (YES at step S501), it is checked whether a combination of the source IP address, the user code, and the destination alias number is in the user-level communication-permitted address table (step S502).

If the combination is not in the table (NO at step S503), a Release Complete message is returned to the call-requester IP facsimile machine FZ (step S504), and then the process ends at this time.

On the other hand, if this combination is in the table (YES at step S503), it is checked whether the alias number starts with 0 (step S505). If the result of step S505 is NO, a destination IP address is acquired by referring to the alias-IP address association table (step S506).

Then, the IP address is called to connect to the IP facsimile machine FZ, and then a Connect message is returned to the call-requester IP facsimile machine FZ (step S507). With this, an operation of transmitting predetermined image data is performed between the call-requester IP facsimile machine FZ and the destination IP facsimile machine FZ (step S508).

Then, when the image-data transmitting operation ends, the connection for call control is disconnected (step S509), and the operation ends at this time.

On the other hand, if the result of step S505 is YES, the VoIP gateway GW is determined as a connection destination (step S510). Then, the IP address of the VoIP gateway GW is called to connect to a group-3 facsimile machine ahead thereof, and then a Connect message is returned to the call-requester IP facsimile machine FZ (step S511).

With this, an operation of transmitting predetermined image data is performed via the VoIP gateway GW between the call-requester IP facsimile machine FZ and the destination group-3 facsimile machine (step S512).

Then, when the image-data transmitting operation ends, the procedure goes to step S509, where the connection for call control is disconnected, and the operation ends at this time.

Meanwhile, in the user-level communication-permitted address table depicted in FIG. 15A, the case is depicted in which the sender's user code is set for each IP facsimile machine FZ. When a user code (identification information for identifying the operator) unique to the operator (user) of all IP facsimile machines FZ communicating with the call control server SV is provided, as shown in FIG. 15B, the user-level communication-permitted address table contains only combinations of a sender's user code and a destination alias number, and the source IP addresses are not required. That is, the identification information for identifying the operator includes combinations of the IP address of the IP facsimile machine FZ and the user code in FIG. 15A, whilst the identification information includes only user codes in FIG. 15B.

Figure 17:
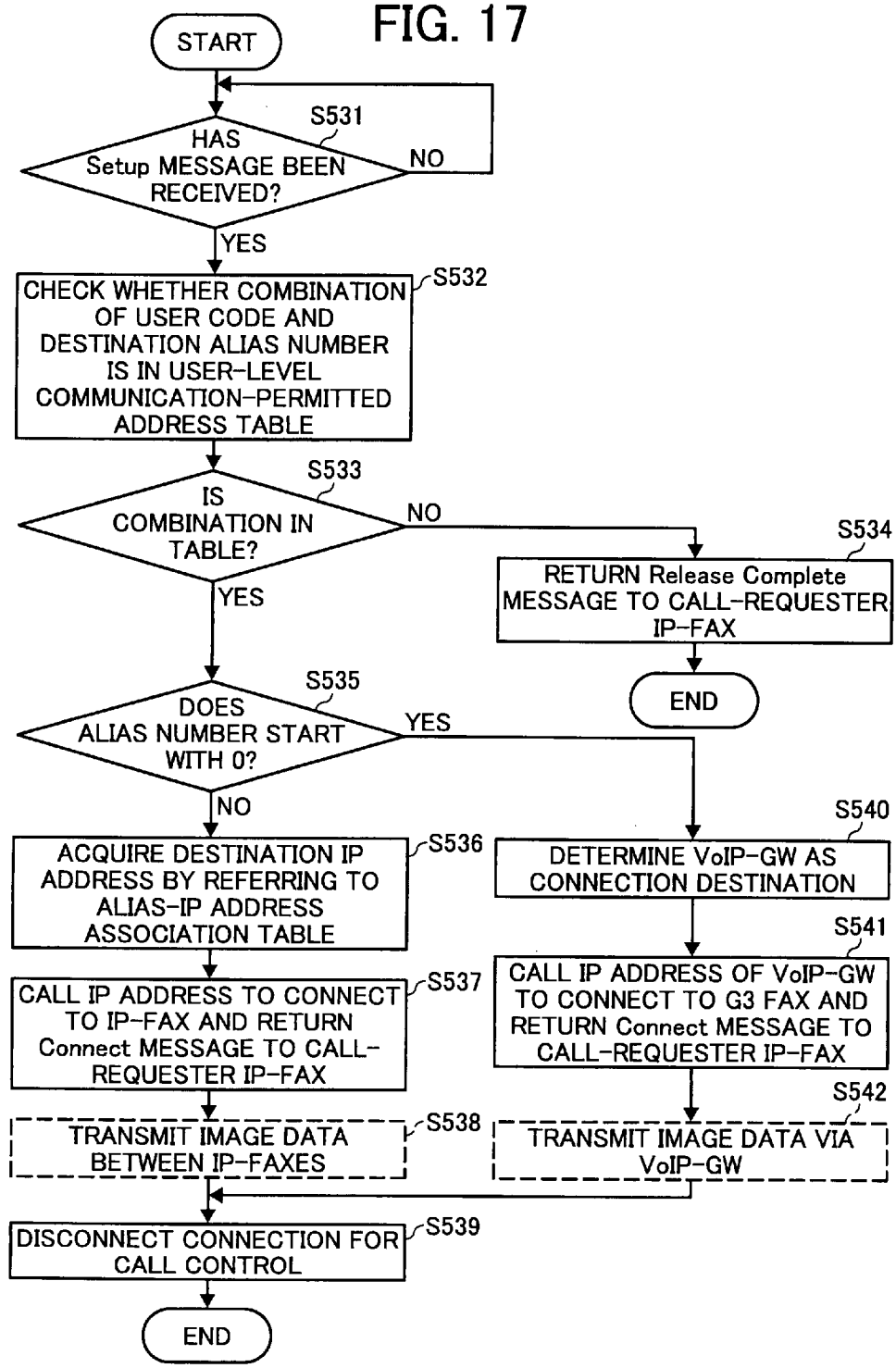

An operation flow of the call control server SV in this case is depicted in FIG. 17.

Upon receipt of a Setup message (YES at step S531), it is checked whether a combination of the user code and the destination alias number is in the user-level communication-permitted address table (step S532).

If the combination is not in the table (NO at step S533), a Release Complete message is returned to the call-requester IP facsimile machine FZ (step S534), and then the process ends at this time.

On the other hand, if this combination is in the table (YES at step S533), it is checked whether the alias number starts with 0 (step S535). If the result of step 535 is NO, a destination IP address is acquired by referring to the alias-IP address association table (step S536).

Then, the IP address is called to connect to the IP facsimile machine FZ, and then a Connect message is returned to the call-requester IP facsimile machine FZ (step S537). With this, an operation of transmitting predetermined image data is performed between the call-requester IP facsimile machine FZ and the destination IP facsimile machine FZ (step S538).

Then, when the image-data transmitting operation ends, the connection for call control is disconnected (step S539), and the operation ends at this time.

On the other hand, if the result of step S535 is YES, the VoIP gateway GW is determined as a connection destination (step S540). Then, the IP address of the VoIP gateway GW is called to connect to a group-3 facsimile machine ahead thereof, and then a Connect message is returned to the call-requester IP facsimile machine FZ (step S541).

With this, an operation of transmitting predetermined image data is performed via the VoIP gateway GW between the call-requester IP facsimile machine FZ and the destination group-3 facsimile machine (step S542).

Then, when the image-data transmitting operation ends, the procedure goes to step S539, where the connection for call control is disconnected, and the operation ends at this time.

Meanwhile, in the fifth embodiment described above, a determination of whether the connection is permitted is made for each operator (user) performing a transmitting operation of the IP facsimile FZ. In a sixth embodiment, this determination is made for each group code shared among a plurality of operators.

In each of the IP facsimile machines FZa, FZb, and FZc, user codes recorded on the IC cards 86 are classified into groups, and a group code provided to each group is associated with the user codes in that group and is stored in the HD 71.

The call control server SV has stored therein a combination table depicting combinations of a source IP address, a source group code, and a destination alias number among any of the IP facsimile machines FZa, FZb, and FZc for which communication is permitted for each group (such a table is referred to as a group-level communication-permitted address table).

An example of this group-level communication-permitted address table is depicted in FIG. 18. In FIG. 18, only one destination alias number is provided for a source group code. Alternatively, a plurality of destination alias numbers can be registered for each group code. A system administrator can change and add new data to the data in this table, as appropriate.

When the operator (user) holds the IC card 86 over the vicinity of the IC card reader 79 of the IP facsimile machine FZa, the IC card reader 79 wirelessly reads the user code recorded on the IC card 86.

The IP facsimile machine FZa stores this user code in the main memory 61 and also removes the non-active mode. Then, when the operator performs an operation of transmission to the IP facsimile machine FZc, the IP facsimile machine FZa sets the alias number of the IP facsimile machine FZc in destinationAddress, which is a parameter of Setup-UUIE to be included in a user-user information element of a Setup message, and also sets the group code corresponding to the user code stored in advance, in conferenceID, which is a parameter of Setup-UUIE, and then transmits the result to the call control server SV.

Here, conferenceID is originally a conference ID for use in teleconference, but since no teleconference is performed on the IP facsimile machine FZ, this parameter is used for a group code.

Upon receiving this Setup message, the call control server SV acquires the alias number, which is a value of destinationAddress, and the group code, which is a value of conferenceID, included in this message, and also acquires the IP address of the IP facsimile machine FZa, which is the transmission source, from the header of a TCP packet with which this Setup message is sent, thereby checking whether a combination of this IP address, the group code, and the destination alias number is in the group-level communication-permitted address table.

When confirming that this combination is in the group-level communication-permitted address table, the call control server SV acquires a destination IP address by referring to the alias-IP address association table. Then, the call control server SV calls the IP address to connect to the IP facsimile machine FZc, and then returns a Connect message, which is a normal response, to the IP facsimile machine FZa to connect a channel for facsimile communication between the IP facsimile machine FZa and the IP facsimile machine FZc, thereby performing facsimile communication complying with ITU-T Recommendations T.38.

Figure 19:
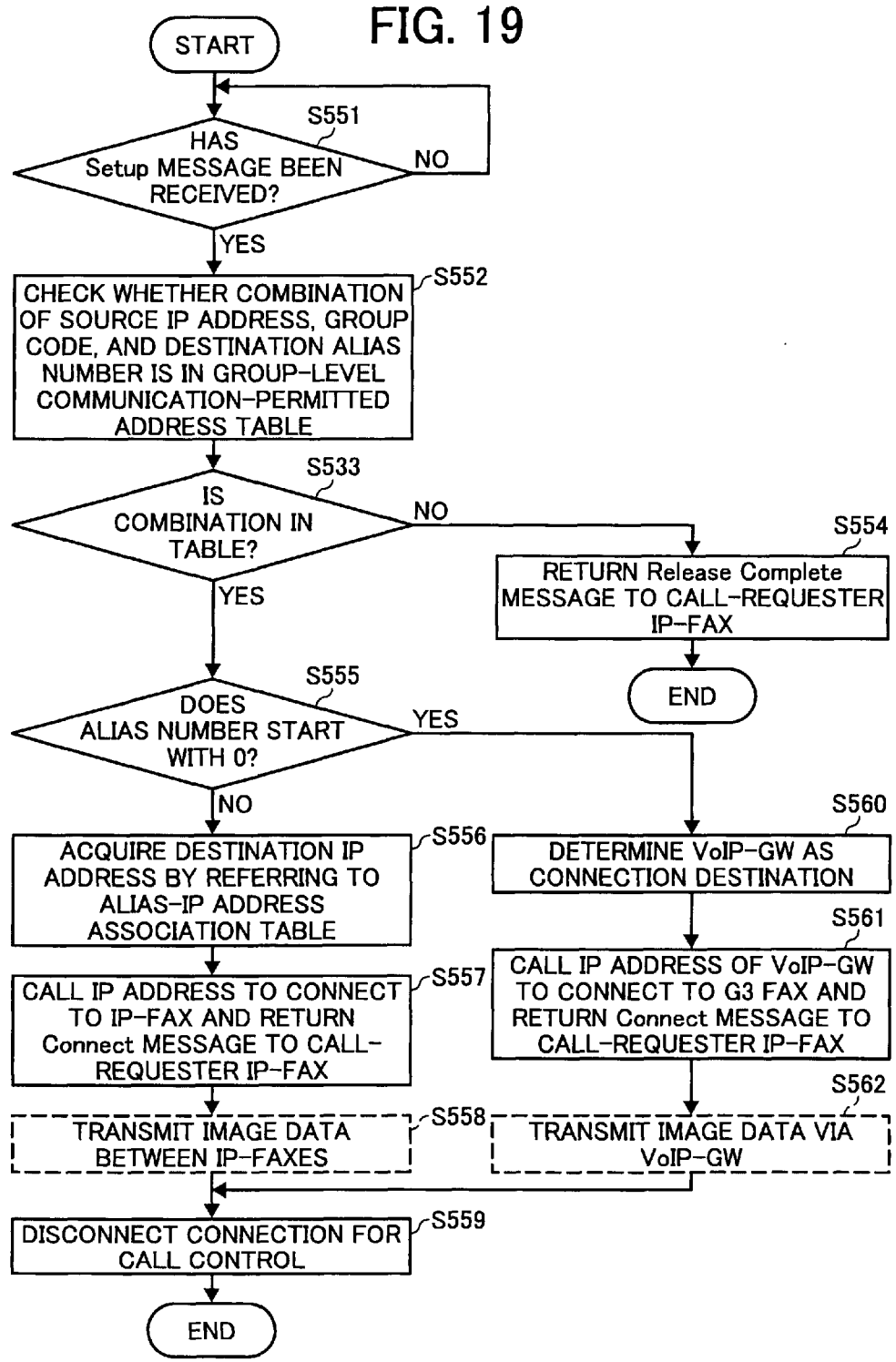
FIGS. 19 to 21 are flowcharts of the operation of the call control server.

An operation flow of the call control server SV in this case is depicted in FIG. 19.

Upon receiving a Setup message (YES at step S551), it is checked whether a combination of the source IP address, the group code, and the destination alias number is in the group-level communication-permitted address table (step S552).

If the combination is not in the table (NO at step S553), a Release Complete message is returned to the call-requester IP facsimile machine FZ (step S554), and then the process ends at this time.

On the other hand, if this combination is in the table (YES at step S553), it is checked whether the alias number starts with 0 (step S555). If the result of step S555 is NO, a destination IP address is acquired by referring to the alias-IP address association table (step S556).

Then, the IP address is called to connect to the IP facsimile machine FZ, and then a Connect message is returned to the call-requester IP facsimile machine FZ (step S557). With this, an operation of transmitting predetermined image data is performed between the call-requester IP facsimile machine FZ and the destination IP facsimile machine FZ (step S558).

Then, when the image-data transmitting operation ends, the connection for call control is disconnected (step S559), and the operation ends at this time.

On the other hand, if the result of step S555 is YES, the VoIP gateway GW is determined as a connection destination (step S560). Then, the IP address of the VoIP gateway GW is called to connect to a group-3 facsimile machine ahead thereof, and then a Connect message is returned to the call-requester IP facsimile machine FZ (step S561).

With this, an operation of transmitting predetermined image data is performed via the VoIP gateway GW between the call-requester IP facsimile machine FZ and the destination group-3 facsimile machine (step S562).

Then, when the image-data transmitting operation ends, the procedure goes to step S559, where the connection for call control is disconnected, and the operation ends at this time.

Meanwhile, in the system of FIG. 13, if permission or denial of connection with only any IP facsimile machine FZ is desired, a determination of whether the connection is permitted is made only when the source IP address is an IP address of an IP facsimile machine FZ. Such a case is explained next as a seventh embodiment.

In this case, as with the second embodiment, the call control server SV manages an alias-IP address association table for IP telephone terminals and that for IP facsimile machines FZ separately (refer to FIGS. 7A and 7B).

In this case, as with the fifth embodiment, the IP facsimile machine FZa sets the alias number of the IP facsimile machine FZc in destinationAddress, which is a parameter of the Setup message, the IP address thereof in sourceCallSignalAddress, and the user code in conferenceID, which is a parameter of Setup-UUIE, and then transmits the result to the call control server SV.

Upon receiving this Setup message, the call control server SV acquires the IP address of the IP facsimile machine FZa, which is the transmission source, from the header of a TCP packet with which this Setup message is sent. Then, it is determined which alias-IP address association table this IP address is in, that is, the one for IP telephone terminals or the one for IP facsimile machines FZ.

If it is determined that this IP address is in the one for IP facsimile machines FZ, the alias number, which is a value of destinationAddress included in the Setup message previously received, and the user code, which is a value of conferenceID, are acquired, and then it is checked whether a combination of these IP address, user code, and alias number is in the user-level communication-permitted address table.

When confirming that this address combination is in the user-level communication-permitted address table, the call control server SV acquires a destination IP address by referring to the alias-IP address association table. Then, the call control server SV calls the IP address to connect to the IP facsimile machine FZc, and then returns a Connect message, which is a normal response, to the IP facsimile machine FZa to connect a channel for facsimile communication between the IP facsimile machine FZa and the IP facsimile machine FZc, thereby performing facsimile communication complying with ITU-T Recommendations T.38.

Figure 20:
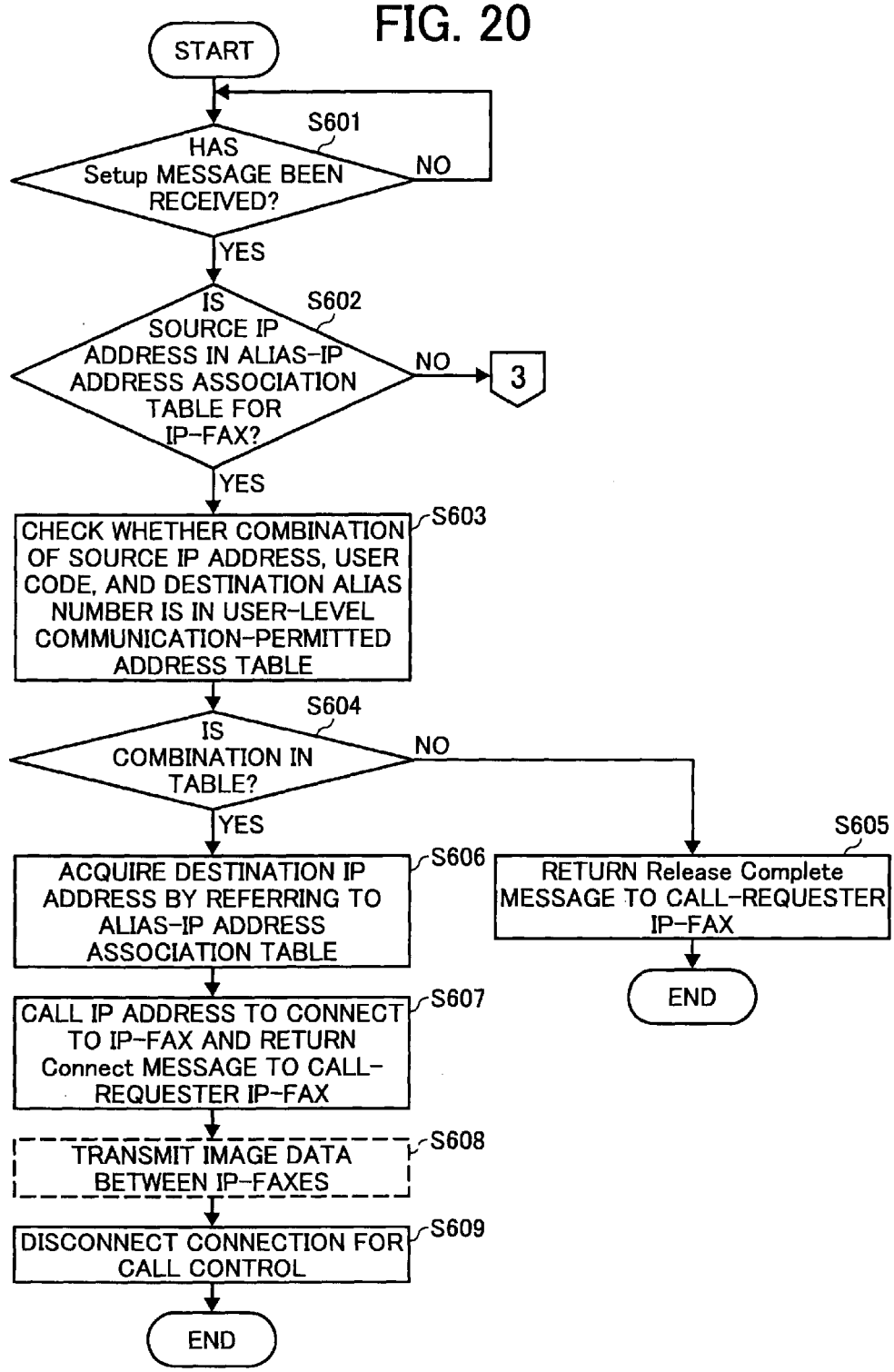
Figure 21:
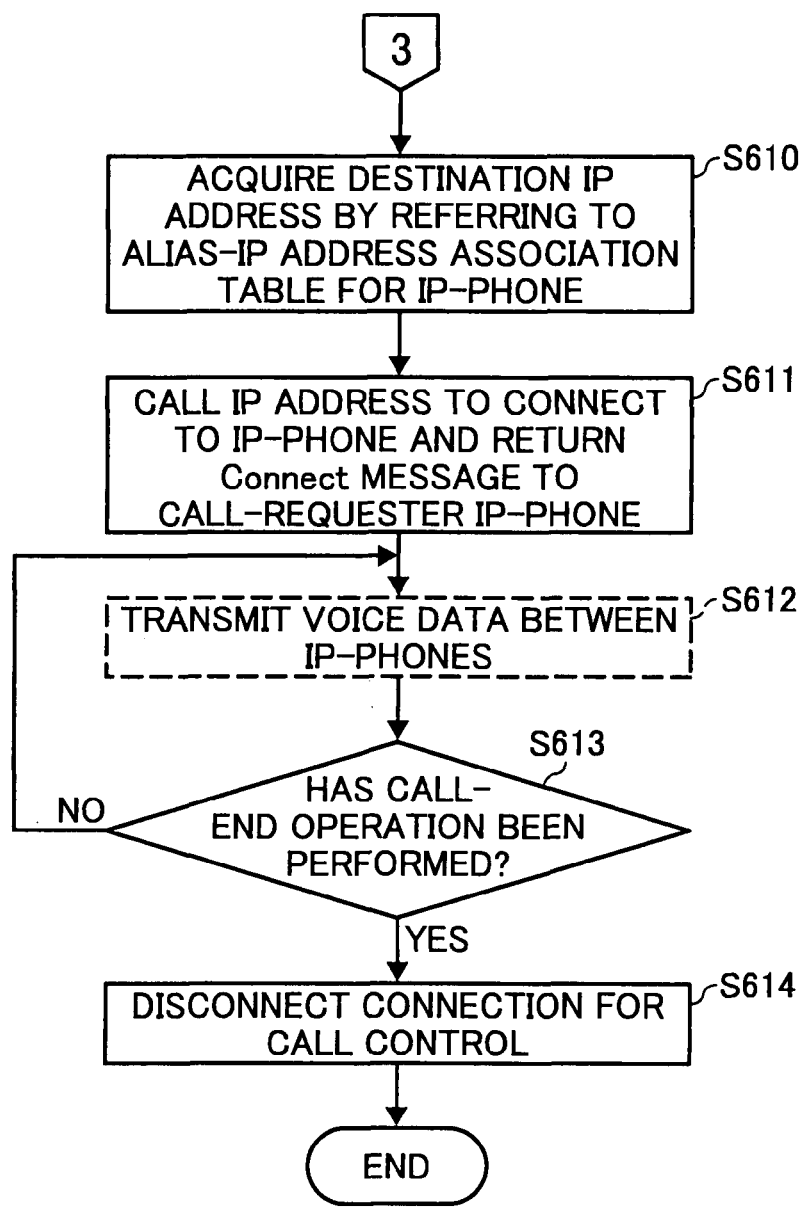

An operation flow of the call control server SV in this case is depicted in FIGS. 20 and 21.

Upon receiving a Setup message (YES at step S601), it is checked whether the source IP address is in the alias-IP address association table for IP facsimile machines FZ (step S602).

If the result of step S602 is YES, it is checked whether a combination of the source IP address, the user code, and the destination alias number is in the user-level communication-permitted address table (step S603).

If this combination is not in the table (NO at step S604), a Release Complete message is returned to the call-requester IP facsimile machine FZ (step S605), and then the process ends at this time.

On the other hand, if this combination is in the table (YES at step S604), a destination IP address is acquired by referring to the alias-IP address association table (step S606).

Then, the IP address is called to connect to the IP facsimile machine FZ, and then a Connect message is returned to the call-requester IP facsimile machine FZ (step S607). With this, an operation of transmitting predetermined image data is performed between the call-requester IP facsimile machine FZ and the destination IP facsimile machine FZ (step S608).

Then, when the image-data transmitting operation ends, the connection for call control is disconnected (step S609), and the operation ends at this time.

On the other hand, if the result of step S602 is NO, a destination IP address is acquired by referring to the alias-IP address association table for IP telephone terminals (step S610). Next, the IP address is called to connect to the IP telephone terminal, and then a Connect message is returned to the call-requester IP telephone terminal (step S611).

With this, voice data is transmitted between IP telephone terminals (step S612), and a call-end operation is waited (NO at step S613). When a call-end operation is performed and the result of step S613 is YES, the connection for call control is disconnected (step S614), and the operation ends at this time.

Figure 22:
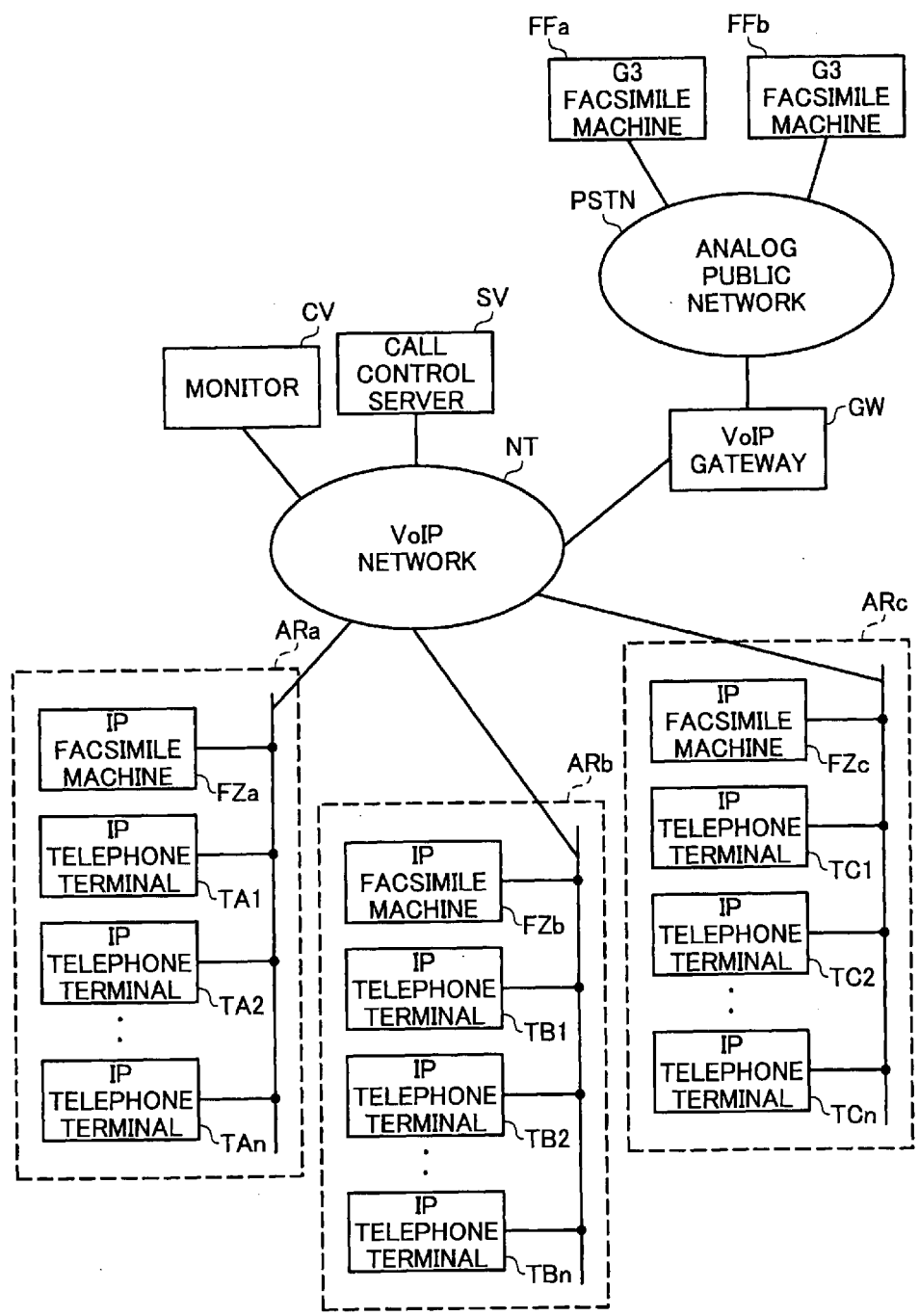
FIG. 22 is a block diagram of a communication system according to still another embodiment of the present invention.

FIG. 22 is a block diagram of a communication system according to an eighth embodiment of the present invention. In FIG. 22, components corresponding to those in FIG. 13 are designated by the same reference numerals, and are not explained herein.

In the embodiment, the VoIP network NT is provided with a monitor CV. In place of the call control server SV, this monitor CV determines whether to permit connection. Here, the monitor CV has a configuration similar to that of FIG. 3, and the configuration is not explained in detail herein.

In this case, as with the fifth embodiment described above, the IP facsimile machine FZa sets the alias number of the IP facsimile machine FZc in destinationAddress, which is a parameter of the Setup message, the IP address thereof in SourceCallSignalAddress, and the user code in conferenceID, which is a parameter of Setup-UUIE, and then transmits the result to the call control server SV.

Upon receiving this Setup message, the call control server SV issues an incoming-call notification to the monitor CV. Upon receiving this notification, the monitor CV issues to the call control server SV a command of requesting acquisition of Setup message data. This command is transmitted by using a GET method in HTTP.

Upon receiving this command, the call control server SV passes the Setup message data to the monitor CV as being included in a HTTP "200 OK" response. Upon receiving this Setup message, the monitor CV acquires the alias number, which is a value of destinationAddress included in this message, the IP address included in sourceCallSignalAddress, and the user code, which is a value of conferenceID, and checks whether a combination of these is in the user-level communication-permitted address table. When confirming that this address combination is in the user-level communication-permitted address table, a command for permitting connection is transmitted to the call control server SV. This command is transmitted by using a POST method in HTTP.

Upon receiving this command, the call control server SV acquires the alias number, which is a value of destinationAddress included in the Setup message previously received, and then acquires a destination IP address by referring to the alias-IP address association table. Then, the IP address is called to connect to the IP facsimile machine FZc, and then a Connect message, which is a normal response, is returned to the IP facsimile machine FZa to connect a channel for facsimile communication between the IP facsimile machine FZa and the IP facsimile machine FZc, thereby performing facsimile communication complying with ITU-T Recommendations T.38.

Figure 23B:
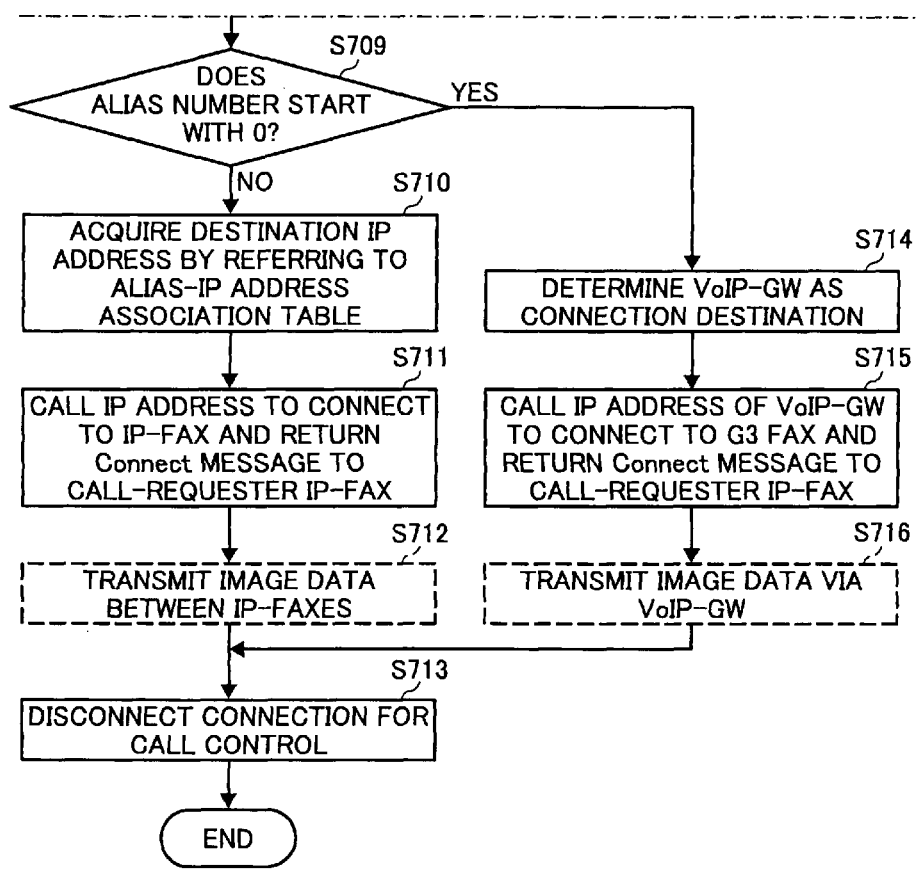
FIG. 23 is a flowchart of the operation of a call control server shown in FIG. 22.

An example of operation of the call control server SV in this case is depicted in FIG. 23, whilst an example of operation of the monitor CV is depicted in FIG. 24.

In FIG. 23, upon receiving this Setup message (YES at step S701), the call control server SV issues an incoming-call notification to the monitor CV (step S702), and waits until a Setup data acquisition request command is received from the monitor CV (NO at step S703). When the result of step S703 is YES, the call control server SV passes the Setup message data (including the user code) to the monitor CV (step S704), and then waits until a connection permit information command is received from the monitor CV (NO at step S705).

When the result of step S705 becomes YES, the connection permit information command is examined to check whether connection has been permitted (step S706). If the result of step S706 is NO, Release Complete message is returned to the IP facsimile machine FZ, which is the call requester (step S707), and then the process ends at this time.

If connection has been permitted (YES at step S706), the alias number is acquired from the Setup message previously received (step S708), and it is checked whether the alias number starts with 0 (step S709).

When the result of step S709 is NO, a destination IP address is acquired by referring to the alias-IP address association table (step S710).

Then, the IP address is called to connect to the IP facsimile machine FZ, and then a Connect message is returned to the call-requester IP facsimile machine FZ (step S711). With this, an operation of transmitting predetermined image data is performed between the call-requester IP facsimile machine FZ and the destination IP facsimile machine FZ (step S712).

Then, when the image-data transmitting operation ends, the connection for call control is disconnected (step S713), and the operation ends at this time.

On the other hand, when the result of step S709 is YES, the VoIP gateway GW is determined as a connection destination (step S714). Then, the IP address of the VoIP gateway GW is called to connect to a group-3 facsimile machine ahead thereof, and then a Connect message is returned to the call-requester IP facsimile machine FZ (step S715).

With this, an operation of transmitting predetermined image data is performed via the VoIP gateway GW between the call-requester IP facsimile machine FZ and the destination group-3 facsimile machine (step S716).

Then, when the image-data transmitting operation ends, the procedure goes to step S713, where the connection for call control is disconnected, and the operation ends at this time.

Also, in FIG. 24, upon receiving an incoming-call notification from the call control server SV (YES at step S801), the monitor CV issues to the call control server SV a Setup data acquisition request command (step S802).

Then, the monitor CV waits until the Setup message data is received from the call control server SV (NO at step S803). When the result of step S803 is YES, the data of the received Setup message is examined to check whether a combination of the source IP address, the user code, and the destination alias number is in the user-level communication-permitted address table (step S804).

If this combination is in the table (YES at step S805), a connection permit command is issued to the call control server SV (step S806), and then the operation ends at this time. Also, if this combination is not in the table and the result of step S805 is NO, a connection deny command is issued to the call control server SV (step S807), and then the operation ends at this time.

Meanwhile, in the embodiment explained above, the user codes are managed independently for each IP facsimile machine FZ (for each area). The case is explained where a user code (identification information for identifying an operator) unique to the operator (user) of the all IP facsimile machines FZ communicating with the call control server SV is provided. In this case, the user-level communication-permitted address table contains only combinations of a sender's user code and a destination alias number, and the source IP addresses are not required (refer to FIG. 15B). That is, the identification information for identifying the operator includes combinations of the IP address of the IP facsimile machine FZ and the user code in FIG. 15A, whilst the identification information includes only user codes in FIG. 15B.

Operations of the IP facsimile machines FZa, FZb, and FZc and the call control server SV in this case are similar to those in the eighth embodiment described above, and therefore are not explained herein.

Figure 25:
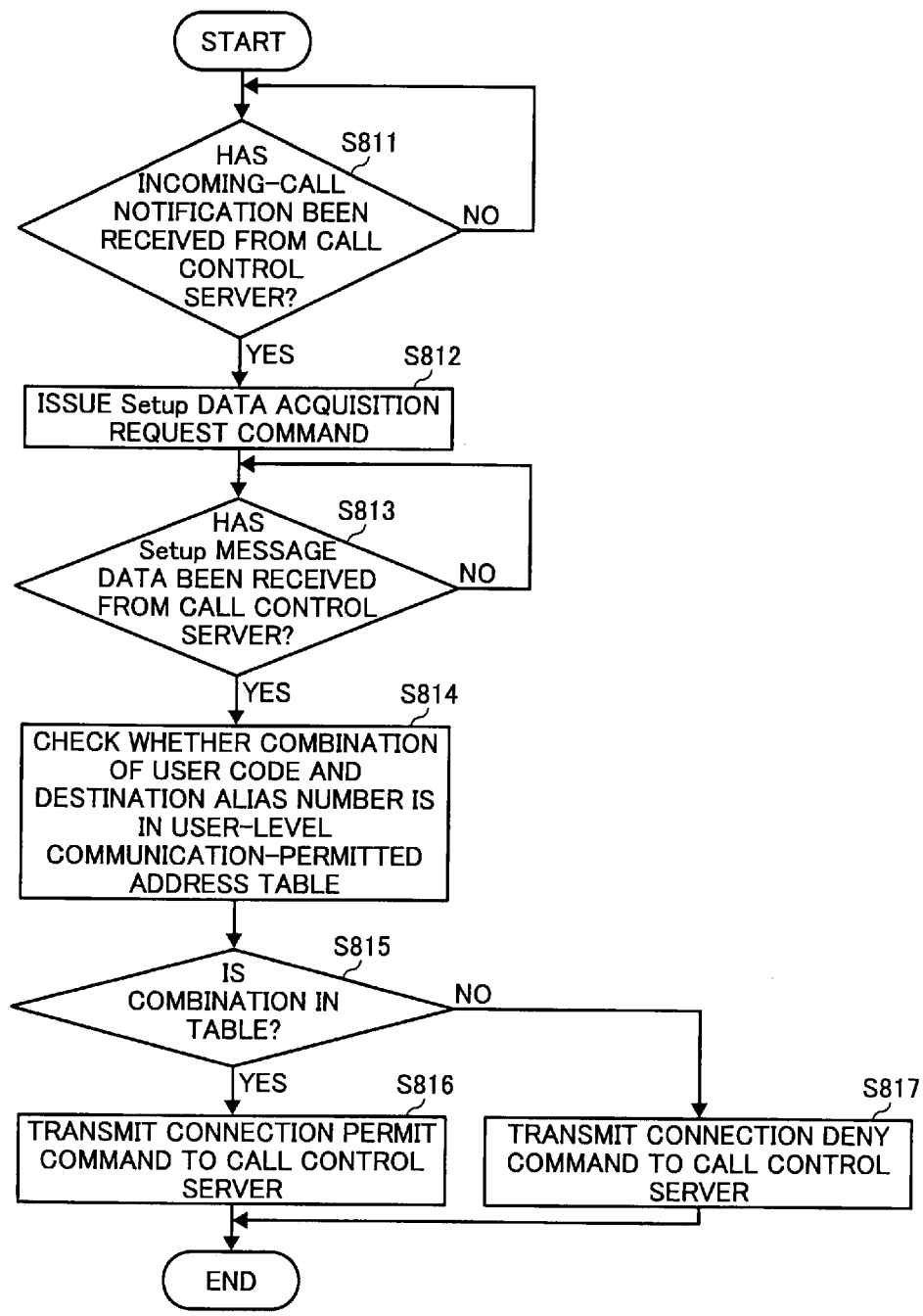

An example of operation of the monitor CV in this case is depicted in FIG. 25.

Upon receiving an incoming-call notification from the call control server SV (YES at step S811), the monitor CV issues to the call control server SV a Setup data acquisition request command (step S812).

Then, the monitor CV waits until the Setup message data is received from the call control server SV (NO at step S813). When the result of step S813 is YES, the data of the received Setup message is examined to check whether a combination of the user code and the destination alias number is in the user-level communication-permitted address table (step S814).

If this combination is in the table (YES at step S815), a connection permit command is issued to the call control server SV (step S816), and then the operation ends at this time. Also, if this combination is not in the table and the result of step S815 is NO, a connection deny command is issued to the call control server SV (step S817), and then the operation ends at this time.

Meanwhile, in the eighth embodiment described above, a determination of whether the connection is permitted is made for each operator (user) performing a transmitting operation of the IP facsimile FZ. In a ninth embodiment, this determination is made for each group code shared among a plurality of operators. Also in this case, the call control server SV has stored therein the group-level communication-permitted address table as depicted in FIG. 18.

Figure 26B:
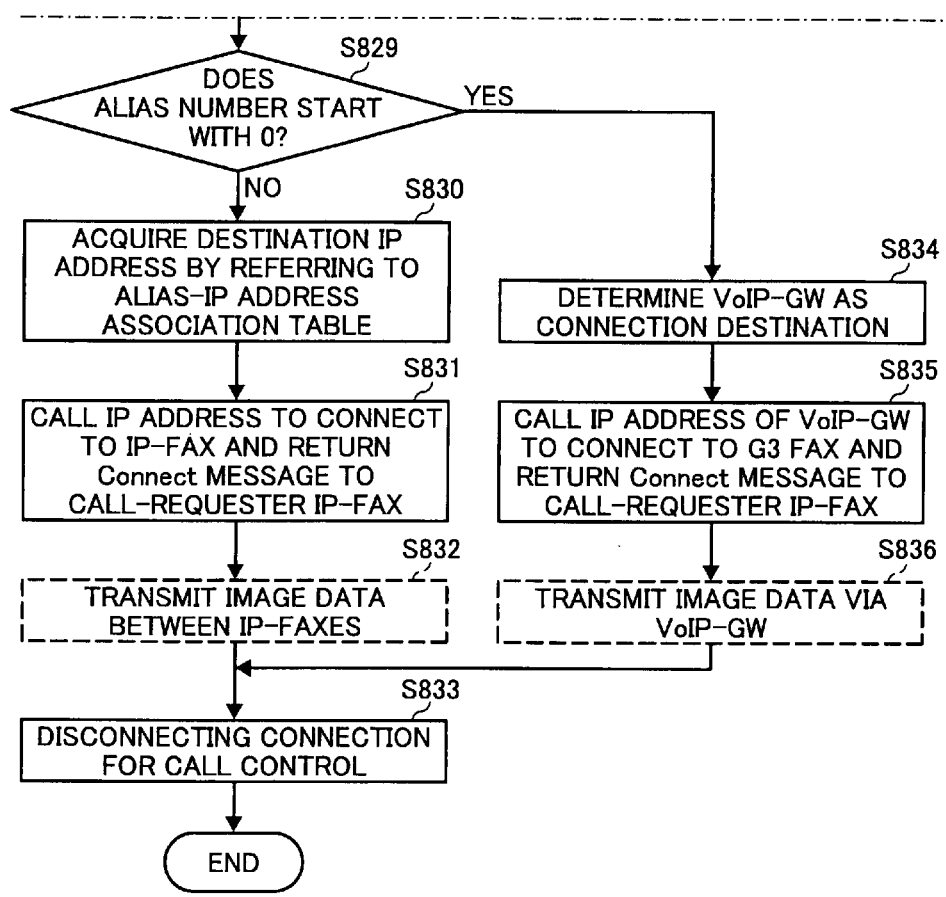
FIG. 26 is a flowchart of the operation of the call control server.
Figure 27:
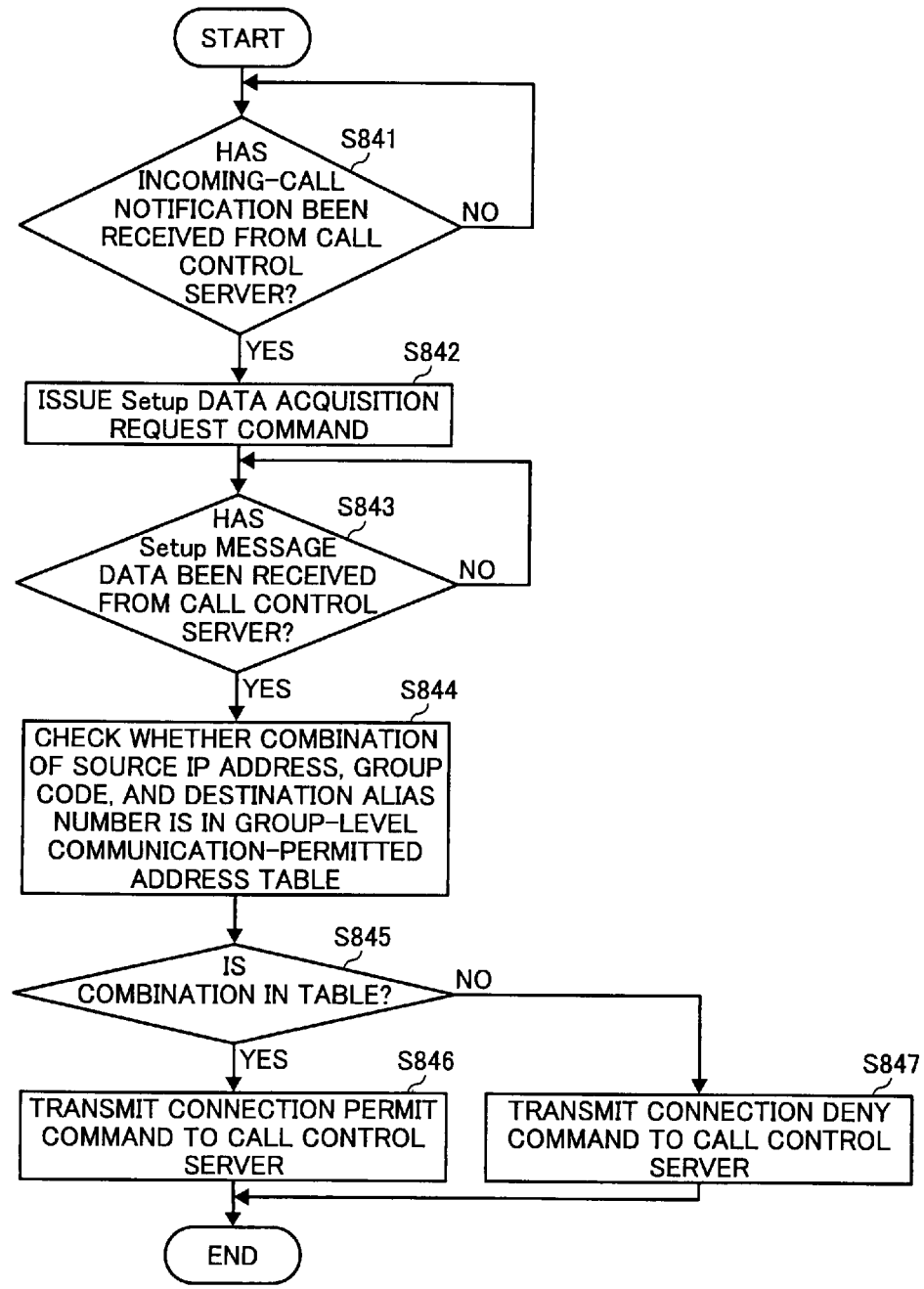
FIG. 27 is a flowchart of the operation of the monitor.

An example of operation of the call control server SV in this case is depicted in FIG. 26, whilst an example of operation of the monitor CV is depicted in FIG. 27.

In FIG. 26, upon receiving this Setup message (YES at step S821), the call control server SV issues an incoming-call notification to the monitor CV (step S822), and waits until a Setup data acquisition request command is received from the monitor CV (NO at step S823). When the result of step S823 is YES, the call control server SV passes the Setup message data (including the group code) to the monitor CV (step S824), and then waits until a connection permit information command is received from the monitor CV (NO at step S825).

When the result of step S825 becomes YES, the connection permit information command is examined to check whether connection has been permitted (step S826). If the result of step S826 is NO, Release Complete message is returned to the IP facsimile machine FZ, which is the call requester (step S827), and then the process ends at this time.

If connection has been permitted (YES at step S826), the alias number is acquired from the Setup message previously received (step S828), and it is checked whether the alias number starts with 0 (step S829).

When the result of step S829 is NO, a destination IP address is acquired by referring to the alias-IP address association table (step S830).

Then, the IP address is called to connect to the IP facsimile machine FZ, and then a Connect message is returned to the call-requester IP facsimile machine FZ (step S831). With this, an operation of transmitting predetermined image data is performed between the call-requester IP facsimile machine FZ and the destination IP facsimile machine FZ (step S832).

Then, when the image-data transmitting operation ends, the connection for call control is disconnected (step S833), and the operation ends at this time.

On the other hand, when the result of step S829 is YES, the VoIP gateway GW is determined as a connection destination (step S834). Then, the IP address of the VoIP gateway GW is called to connect to a group-3 facsimile machine ahead thereof, and then a Connect message is returned to the call-requester IP facsimile machine FZ (step S835).

With this, an operation of transmitting predetermined image data is performed via the VoIP gateway GW between the call-requester IP facsimile machine FZ and the destination group-3 facsimile machine (step S836).

Then, when the image-data transmitting operation ends, the procedure goes to step S833, where the connection for call control is disconnected, and the operation ends at this time.

Also, in FIG. 27, upon receiving an incoming-call notification from the call control server SV (YES at step S841), the monitor CV issues to the call control server SV a Setup data acquisition request command (step S842).

Then, the monitor CV waits until the Setup message data is received from the call control server SV (NO at step S843). When the result of step S843 is YES, the data of the received Setup message is examined to check whether a combination of the source IP address, the group code, and the destination alias number is in the group-level communication-permitted address table (step S844).

If this combination is in the table (YES at step S845), a connection permit command is issued to the call control server SV (step S846), and then the operation ends at this time. Also, if this combination is not in the table and the result of step S845 is NO, a connection deny command is issued to the call control server SV (step S847), and then the operation ends at this time.

In a tenth embodiment, as with the second embodiment, the call control server SV manages an alias-IP address association table for IP telephone terminals and that for IP facsimile machines FZ separately.

Also, as with the fifth embodiment described above, the IP facsimile machine FZa sets the alias number of the IP facsimile machine FZc in destinationAddress, which is a parameter of the Setup message, the IP address thereof in SourceCallSignalAddress, and the user code in conferenceID, which is a parameter of Setup-UUIE, and then transmits the result to the call control server SV.

Upon receiving this Setup message, the call control server SV acquires the IP address of the IP facsimile machine FZa, which is the transmission source, from the header of a TCP packet with which this Setup message is sent. Then, it is determined which alias-IP address association table this IP address is in, that is, the one for IP telephone terminals or the one for IP facsimile machines FZ. If it is determined that this IP address is in the one for IP facsimile machines FZ, an incoming call notification is issued to the monitor CV.

Upon receiving this notification, the monitor CV issues to the call control server SV a command of requesting acquisition of Setup message data. This command is transmitted by using a GET method in HTTP.

Upon receiving this command, the call control server SV passes the Setup message data to the monitor CV as being included in a HTTP "200 OK" response. Upon receiving this Setup message, the monitor CV acquires the alias number, which is a value of destinationAddress included in this message, the IP address included in sourceCallSignalAddress, and the user code, which is a value of conferenceID, and checks whether a combination of these is in the user-level communication-permitted address table. When confirming that this address combination is in the user-level communication-permitted address table, a command for permitting connection is transmitted to the call control server SV. This command is transmitted by using a POST method in HTTP.

Upon receiving this command, the call control server SV acquires the alias number, which is a value of destinationAddress included in the Setup message previously received, and then acquires a destination IP address by referring to the alias-IP address association table. Then, the IP address is called to connect to the IP facsimile machine FZc, and then a Connect message, which is a normal response, is returned to the IP facsimile machine FZa to connect a channel for facsimile communication between the IP facsimile machine FZa and the IP facsimile machine FZc, thereby performing facsimile communication complying with ITU-T Recommendations T.38.

On the other hand, if the source IP address is for IP telephone terminals, the call control server SV does not issue an incoming-call notification to the monitor CV, but acquires the alias number, which is a value of destinationAddress included in the Setup message, and acquires a destination IP address by referring to the alias-IP address association table for IP telephone terminals. Then, the call control server SV calls the IP address to connect to the IP telephone terminal, and then returns a Connect message, which is a normal response, to the source IP telephone terminal. Then, a channel for voice is connected between IP telephone terminals for transmission and reception of voice data.

Figure 28B:
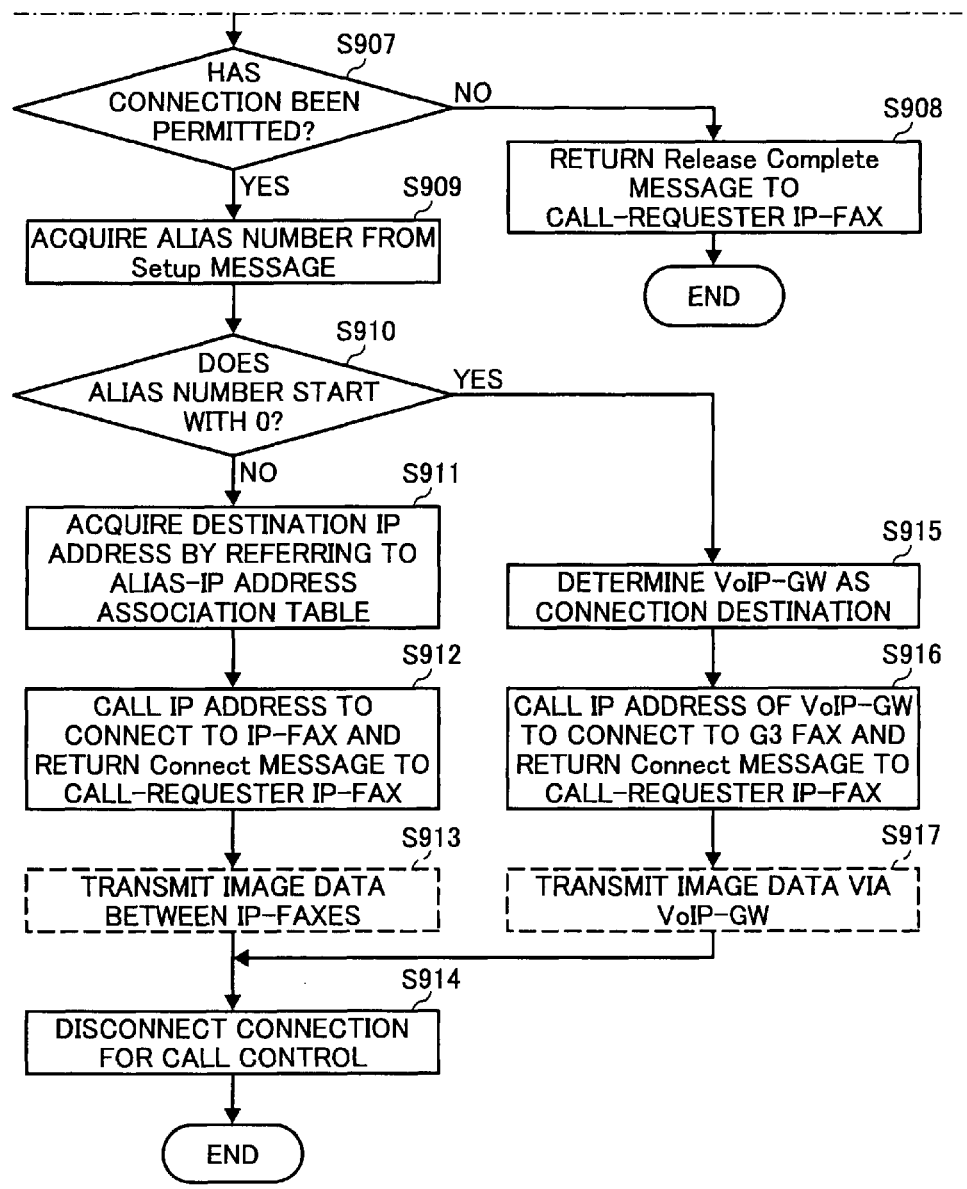
FIGS. 28 and 29 are flowcharts of the operation of the call control server.
Figure 29:
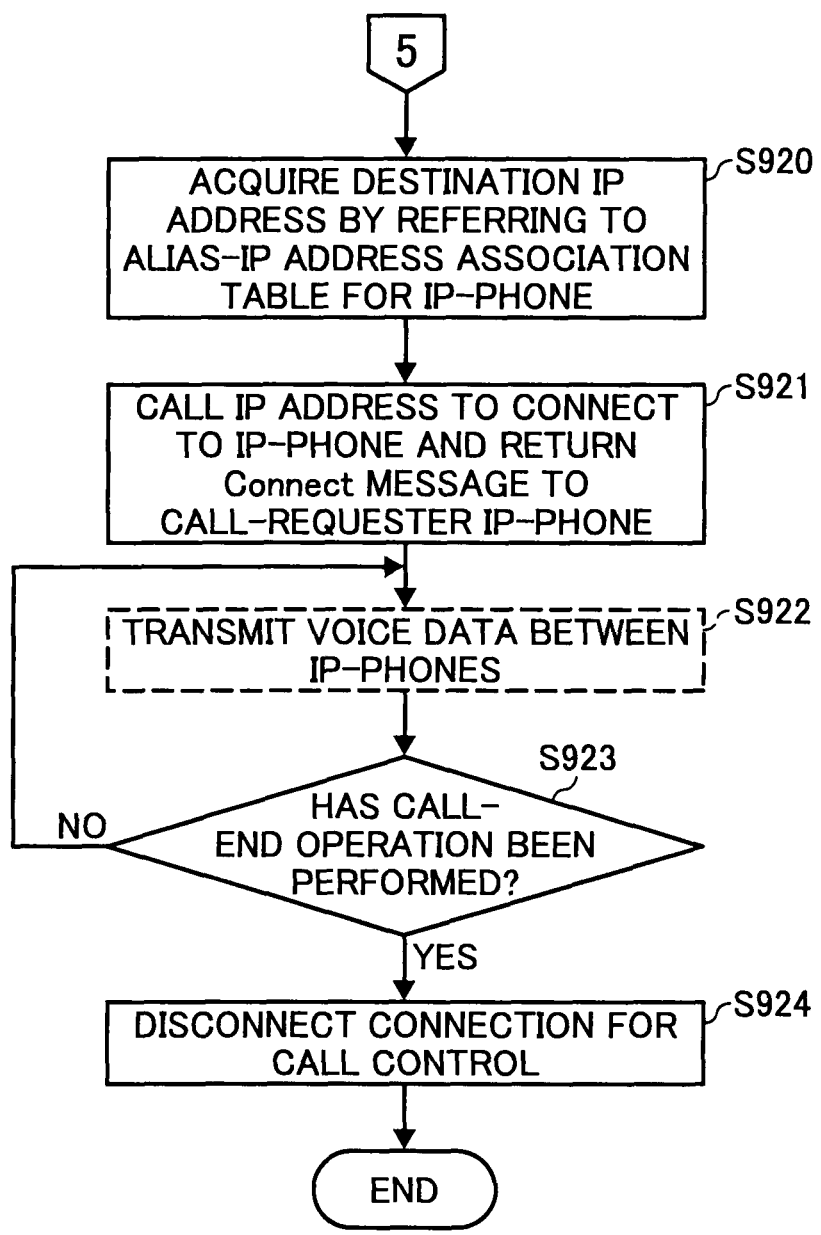

An operation flow of the call control server SV is depicted in FIGS. 28 and 29. Here, an operation flow of the monitor CV in this case is similar to that in FIG. 24, and is not explained herein.

Upon receiving this Setup message (YES at step S901), the call control server SV checks whether the source IP address is in the alias-IP address association table for IP facsimile machines (step S902). If the result of step S902 is YES, the call control server SV issues an incoming-call notification to the monitor CV (step S903), and waits until a Setup data acquisition request command is received from the monitor CV (NO at step S904). When the result of step S904 is YES, the call control server SV passes the Setup message data (including the user code) to the monitor CV (step S905), and then waits until a connection permit information command is received from the monitor CV (NO at step S906).

When the result of step S906 becomes YES, the connection permit information command is examined to check whether connection has been permitted (step S907). If the result of step S907 is NO, Release Complete message is returned to the IP facsimile machine FZ, which is the call requester (step S908), and then the process ends at this time.

If connection has been permitted (YES at step S907), the alias number is acquired from the Setup message previously received (step S909), and it is checked whether the alias number starts with 0 (step S910).

When the result of step S910 is NO, a destination IP address is acquired by referring to the alias-IP address association table (step S911).

Then, the IP address is called to connect to the IP facsimile machine FZ, and then a Connect message is returned to the call-requester IP facsimile machine FZ (step S912). With this, an operation of transmitting predetermined image data is performed between the call-requester IP facsimile machine FZ and the destination IP facsimile machine FZ (step S913).

Then, when the image-data transmitting operation ends, the connection for call control is disconnected (step S914), and the operation ends at this time.

On the other hand, when the result of step S910 is YES, the VoIP gateway GW is determined as a connection destination (step S915). Then, the IP address of the VoIP gateway GW is called to connect to a group-3 facsimile machine ahead thereof, and then a Connect message is returned to the call-requester IP facsimile machine FZ (step S916).

With this, an operation of transmitting predetermined image data is performed via the VoIP gateway GW between the call-requester IP facsimile machine FZ and the destination group-3 facsimile machine (step S917).

Then, when the image-data transmitting operation ends, the procedure goes to step S914, where the connection for call control is disconnected, and the operation ends at this time.

On the other hand, if the result of step S902 is NO, a destination IP address is acquired by referring to the alias-IP address association table for IP telephone terminals (step S920). Next, the IP address is called to connect to the IP telephone terminal, and then a Connect message is returned to the call-requester IP telephone terminal (step S921).

With this, voice data is transmitted between IP telephone terminals (step S922), and a call-end operation is waited (NO at step S923). When a call-end operation is performed and the result of step S923 is YES, the connection for call control is disconnected (step S924), and the operation ends at this time.

Meanwhile, in the embodiments explained above, the connection monitoring application implemented in the monitor CV can be downloaded from a server or the like for use.

In the embodiments explained above, the case has been explained in which ITU-T Recommendations H. 323 is used as a protocol for call control. However, another protocol can be used, such as Session Initiation Protocol (SIP; refer to RFC 3261 of Internet Engineering Task Force (IETF)). Furthermore, Hypertext Transfer Protocol (HTTP) is a communication protocol for information exchange between a Web server and a Web client in a Web service on the Internet (IP network), and was established by a standardizing organization called World Wide Web Consortium (W3C).

In the embodiments explained above, when a determination of permitting communication between a transmission source and a destination source is made, a table containing combinations for which communication is permitted is referred to. Alternatively, a table containing combinations for which communication is not permitted can be created in advance and referred to.

In the embodiments explained above, the operation of the call control server SV and the operation of the monitor are controlled by a program executed on them. Also, the program can be stored in an appropriate storage medium or the like, or can be distributed over a network. Furthermore, in each of the embodiments explained above, the identification information for identifying the operator includes the user code, or a combination of the user code and the address of the source communication terminal. Alternatively, the identification information for identifying the operator can include a combination of arbitrary pieces of information other than the above.

As set forth hereinabove, according to an embodiment of the present invention, effects can be achieved in which, since a check on a transmission source and a transmission destination is automatically performed at a call control server, human error that might occur when the transmission source and the transmission destination are visually checked is prevented, and erroneous leakage of personal information or corporate secret to third parties due to erroneous transmission is prevented.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A call control server in a communication system that includes an IP voice communication terminal, an IP nonvocal communication terminal, and the call control server, in which each of the IP communication terminals are configured to transmit and receive a call through the call control server and transmit identification information that identifies an operator of the IP communication terminal that is a source of the call, and the call control server connects the IP communication terminal that is the source of the call to a destination terminal which is one of the IP voice communication terminal, the IP nonvocal communication terminal, and a non-IP communication terminal, the call control server comprising:

memory storing instructions; and
one or more processors configured to execute the instructions such that the one or more processors are configured to,
receive destination information and the identification information from the IP communication terminal that is the source of the call as a call request;
check a source address of the IP communication terminal that is the source of the call,
perform a first determining operation that includes determining whether or not the source address of the IP communication terminal that is source of the call is an address corresponding to the IP nonvocal communication terminal;
check the address of the IP communication terminal that is the source of the call and the identification information,
perform a second determining operation that includes determining based on the destination information whether or not a transmission from the IP communication terminal that is the source of the call to the destination terminal is permitted, when the first determining operation determines that the address of the IP communication terminal that is the source of the call is an address corresponding to the IP nonvocal communication terminal;
obtaining an address of the destination terminal, and transmitting the call to the address of the destination terminal to connect the IP communication terminal that is the source of the call to the destination terminal, when the first determining operation determines that the address of the IP communication terminal that is the source of the call is not an address corresponding to the IP nonvocal communication terminal; and
transmitting the call to an address obtained by a translation from the destination information, only when the second determining operation determines that the transmission is permitted, to connect the IP communication terminal that is the source of the call to the destination terminal, the destination information being an alias number,
the one or more processors being configured to execute the instructions such that the transmitting the call to an address obtained by a translation from the alias number includes,
determining whether the alias number starts with a first specified digit,
if the alias number starts with the first specified digit,
translating the alias number to an address of a voice over IP (VoIP) gateway, and transmitting the call to the address of the VoIP gateway, and
if the alias number does not start with the first specified digit,
translating the alias number into a corresponding IP address by retrieving the corresponding IP address from an IP address table, based on the alias number, transmitting the call to the destination terminal using the corresponding IP address, and not transmitting the call to the VoIP gateway.

2. The call control server according to claim 1, wherein, the one or more processors are configured to execute the instructions such that the one or more processors are configured to perform the second determining operation such that only when the call request is received from the IP nonvocal communication terminal, the second determining operation determines whether a transmission from a user having the source address and identification of the IP nonvocal communication terminal to the destination terminal is permitted, and, only if permitted, the destination information is translated to an address to make a call request to the destination terminal to connect the IP nonvocal communication terminal to the destination terminal.

3. The call control server according to claim 1, wherein the call control server is configured such that each number that starts with the first specified digit is a number recognized by the call control server as a number of a group-3 (G3) fax machine.

4. A call control server in a communication system that includes an IP voice communication terminal, an IP nonvocal communication terminal, and the call control server, in which each of the IP communication terminals are configured to transmit and receive a call through the call control server, and a monitor configured to issue to the call control server a command including information on whether or not to permit a transmission from the IP communication terminal that is a source of the call to a destination terminal based on destination information and an address of the IP communication terminal that is a source of the call extracted from a call-connection message received from the call control server, and the call server is configured to connect the IP communication terminal that is the source of the call to a destination terminal which is one of the IP voice communication terminal, the IP nonvocal communication terminal, and a non-IP communication terminal, the call control server comprising:

memory storing instructions; and
one or more processors configured to execute the instructions such that the one or more processors are configured to,
receive the call-connection message including the destination information from the IP communication terminal that is the source of the call;
perform an inquiring operation that includes transmitting the call-connection message to the monitor and receive the command from the monitor; and
perform a call connecting operation that includes originating a call to an address obtained by a translation from the destination information, only when the transmission is permitted by the command, to connect the IP communication terminal that is the source of the call to the destination terminal, the destination information being an alias number,
the one or more processors being configured to execute the instructions such that the one or more processors are configured to perform the call connecting operation such that the originating the call to an address obtained by a translation from the alias number includes,
determining whether the alias number starts with a first specified digit,
if the alias number starts with the first specified digit,
translating the alias number to an address of a voice over IP (VoIP) gateway, and originating the call to the address of the VoIP gateway, and if the alias number does not start with the first specified digit,
translating the alias number into a corresponding IP address by retrieving the corresponding IP address from an IP address table, based on the alias number, originating the call to the destination terminal using the corresponding IP address, and not originating the call to the VoIP gateway.

5. The call control server according to claim 4, wherein the one or more processors are configured to execute the instructions such that the one or more processors are configured to perform the inquiring operation such that only when the call-connection message is received from a IP nonvocal communication terminal, the inquiring operation transmits the call-connection message to the monitor as monitoring information, and the one or more processors are configured to execute the instructions such that the one or more processors are configured to perform the call connecting operation such that when a command, containing information on whether or not a transmission from the IP nonvocal communication terminal to a destination is permitted, is issued from the monitoring device, the call connecting operation translates the destination information to an address and transmits a call request to a destination terminal having the address to connect the IP nonvocal communication terminal to the destination terminal only if the transmission is permitted by the command.

6. The call control server according to claim 4, wherein the call control server is configured such that each number that starts with the first specified digit is a number recognized by the call control server as a number of a group-3 (G3) fax machine.

7. A call control server in a communication system that includes an IP voice communication terminal, an IP nonvocal communication terminal, and the call control server, in which each of the IP communication terminals are configured to transmit and receive a call through the call control server and transmit identification information that identifies an operator of the IP communication terminal that is a source of the call, and the call server is configured to connect the IP communication terminal that is a source of the call to a destination terminal which is one of the IP voice communication terminal, the IP nonvocal communication terminal, and a non-IP communication terminal communication terminal when transmitting the call, the call control server comprising:

memory storing instructions; and
one or more processors configured to execute the instructions such that the one or more processors are configured to,
receive destination information together with the identification information from the IP communication terminal that is the source of the call as a call request;
check a source address of the IP communication terminal that is the source of the call,
perform a first determining operation that includes determining whether or not the address of the IP communication terminal that is the source of the call is an address corresponding to the IP nonvocal communication terminal;
perform a second determining operation that includes determining based on the destination information and the identification information whether or not a transmission to a destination terminal is permitted for the IP communication terminal that is the source of the call, when the first determining operation determines that the address of the IP communication terminal that is the source of the call is an address corresponding to the IP nonvocal communication terminal;

perform a first call connecting operation that includes obtaining an address of the destination terminal, and transmitting the call to the address of the destination terminal to connect the IP communication terminal that is the source of the call to the destination terminal, when the first determining operation determines that the address of the IP communication terminal that is the source of the call is not an address corresponding to the IP nonvocal communication terminal;
perform a second call connecting operation that includes transmitting the call to an address obtained by a translation from the destination information, only when the second determining unit determines that the transmission is permitted, to connect the IP communication terminal that is the source of the call to the destination terminal, the destination information being an alias number,
the one or more processors being configured to execute the instructions such that the one or more processors are configured to perform the second call connecting operation such that transmitting the call to an address obtained by a translation from the alias number includes,
determining whether the alias number starts with a first specified digit,
if the alias number starts with the first specified digit, translating the alias number to an address of a voice over IP (VoIP) gateway, and transmitting the call to the address of the VoIP gateway, and
if the alias number does not start with the first specified digit,
translating the alias number into a corresponding IP address by retrieving the corresponding IP address from an IP address table, based on the alias number, transmitting the call to the destination terminal using the corresponding IP address, and not transmitting the call to the VoIP gateway.

8. The call control server according to claim 7, wherein the identification information of the operator includes a group code shared by a plurality of operators.

9. The call control server according to claim 7, wherein, the one or more processors are configured to execute the instructions such that the one or more processors are configured to perform the second determining operation such that only when the call request is received from the IP nonvocal communication terminal, the second determining operation determines whether a terminal having the identification information to identify the operator is permitted to make a transmission to the destination terminal and the one or more processors are configured to execute the instructions such that the one or more processors are configured to perform the second call connecting operation such that only when a permission is provided, the second call connecting operation translates destination information to a corresponding address and transmits a call to a destination terminal to establish a connection between the IP nonvocal communication terminal and the destination terminal.

10. The call control server according to claim 7, wherein the call control server is configured such that each number that starts with the first specified digit is a number recognized by the call control server as a number of a group-3 (G3) fax machine.

* * * * *